United States Patent
Kasubke

(10) Patent No.: US 7,540,535 B2
(45) Date of Patent: Jun. 2, 2009

(54) MODULAR UNIT FOR A CONVERTIBLE

(75) Inventor: Wolfgang Kasubke, Georgsmarienhütte (DE)

(73) Assignee: Wilhelm Karmann GmbH, Osnabrusck (DE)

(*) Notice: Subject to any disclaimer, the term of this patent is extended or adjusted under 35 U.S.C. 154(b) by 300 days.

(21) Appl. No.: 11/425,902

(22) Filed: Jun. 22, 2006

(65) Prior Publication Data

US 2006/0290125 A1 Dec. 28, 2006

(30) Foreign Application Priority Data

Jun. 22, 2005 (DE) .................. 10 2005 028 929

(51) Int. Cl.
*B60R 21/13* (2006.01)
(52) U.S. Cl. .................................... 280/756
(58) Field of Classification Search ............... 280/756; B60R 21/13
See application file for complete search history.

(56) References Cited

U.S. PATENT DOCUMENTS

| | | | |
|---|---|---|---|
| 5,056,816 A * | 10/1991 | Lutze et al. | 280/751 |
| 6,352,285 B1 * | 3/2002 | Schulte et al. | 280/756 |
| 6,491,346 B1 * | 12/2002 | Gupta et al. | 297/452.65 |
| 6,902,190 B2 * | 6/2005 | Nass | 280/756 |
| 7,341,278 B2 * | 3/2008 | Queveau et al. | 280/756 |
| 2005/0280253 A1 * | 12/2005 | Queveau et al. | 280/756 |
| 2006/0001248 A1 * | 1/2006 | Queveau et al. | 280/756 |
| 2006/0290124 A1 * | 12/2006 | Kasubke | 280/756 |

FOREIGN PATENT DOCUMENTS

| | | |
|---|---|---|
| DE | 93 04 820 | 1/1994 |
| DE | 196 42 821 | 6/1997 |
| DE | 198 38 989 | 11/1999 |
| DE | 10 2004 016 362 | 10/2004 |
| DE | 103 18 594 | 11/2004 |
| DE | 102006006659 B3 * | 6/2007 |
| EP | 1 084 914 | 3/2001 |
| EP | 1186481 A2 * | 3/2002 |
| WO | WO 2004094197 A1 * | 11/2004 |

* cited by examiner

*Primary Examiner*—Ruth Ilan
*Assistant Examiner*—Drew J. Brown
(74) *Attorney, Agent, or Firm*—Quinn Law Group, PLLC; Christopher W. Quinn

(57) ABSTRACT

The invention relates to a modular unit for a convertible vehicle, comprising a transverse stiffening structure that separates an occupant space from a rear stowage space and a rollover protection system with a first module, attached to the body, with guide devices for a second module, movable between a lowered rest position and an elevated support position, with at least one rollover element, in which a releasable holding device for holding the second module in its rest position, a locking device, by means of which the second module can be automatically supported in a position deviating from its rest position against a force acting in the direction of the rest position, and a drive system, by means of which the second module can be biased in its rest position and moved, as required, in the direction of its support position, are provided. According to the invention, the modular unit comprises at least parts of a convertible top and is designed as a unit that can be preassembled outside of the vehicle and then inserted into the vehicle. As an alternative or in addition, the modular unit comprises seat elements.

32 Claims, 20 Drawing Sheets

MODULAR UNIT FOR A CONVERTIBLE

CROSS-REFERENCE TO RELATED APPLICATIONS

This application claims priority to German Patent Application No. DE 10 2005 028 929, filed on Jun. 22, 2005.

TECHNICAL FIELD

The invention relates to a modular unit for a convertible vehicle.

BACKGROUND OF THE INVENTION

It is known to provide rollover protection systems, having a rollover element, like a rollover bar, in convertible vehicles, to create a survival space for occupants in the event of vehicle rollover, which is allocated to an individual vehicle seat or several vehicle seats and is concealed in its rest position in a cassette attached to the vehicle, from which it can be moved abruptly to an upper support position on recognition of a vehicle accident and can be locked in this support position.

Rollover bars generally used in practice typically consist of a U-shaped bar, whose tubular arms are guided vertically in vertical tubes of a module fastened to the vehicle. In the interior of each arm, a coil spring is arranged, which is biased by a holding device, which can be released as a function of an accident signal of the vehicle sensor mechanism, so that the rollover bar is deployed under the influence of the spring in tenths of a second and locked in its support position by an appropriate locking device. The two tubular arms are then joined by a cross-yoke, over which a cushioned impact element is generally pushed.

A problem in such rollover bars that span the entire width of the vehicle with guiding of their arms in the corresponding vehicle seat is that a so-called drawer effect is often observed, which is understood to mean tilting or jamming of the rollover bar during its activation, as a result of manufacturing tolerances or lack of synchronization of the drives acting on the arms of the bar.

DE 103 18 594 A1 describes a further developed rollover protection device for a vehicle with a rollover bar, formed in a generally U-shaped configuration with a cross-yoke and lateral arms spanning essentially the vehicle width. To avoid tilting of the rollover bar during its transfer from a lowered rest position to an upper support position along fixed guide devices, a central holding and release device for the rollover bar that is controlled by an actuator, and a device that synchronizes displacement of the arms along the guide devices are provided. Additionally, a pass-through opening is provided between the legs of the rollover bar.

DE 198 38 989 C1 is referred to as an example of a rollover protection device allocated to only one vehicle seat, with a rollover element that can be deployed independently of a rollover element allocated to another vehicle seat. In it, a rollover protection device allocated to one vehicle seat is disclosed, consisting of a cassette fastened to the vehicle, a rollover element in the form of a profile bar element extending over the entire width of the cassette, secured and guided in guides and deployable in the cassette, a locking device for self-locking the deployment movement, a spring drive system for deploying the profile bar element, and a mechanical holding device for holding the rollover element in a rest state against the bias force of a compression spring of the spring drive system.

An embodiment of a rollover protection device, advantageous with respect to manufacture, with a vehicle transverse wall as a prefabricated standard element, which is arranged on mounts attached to the body behind vehicle seats, is described, for example, in DE 196 42 821 A1 and EP 1 084 914 A2.

This type of prefabricated partition can be equipped, according to DE 10 2004 016 362 A1, with additional units. Thus it is proposed, rather than mounting a safety belt system directly to a vehicle, to mount the safety belt system on the prefabricated partition, according to DE 93 04 820 U1.

Although the last-named solutions provide a simplification of assembly, different modular units, like a transverse stiffening structure, optionally with a pass-through opening in combination with a rollover protection system, a convertible top and possibly body parts connected to the convertible top mechanism, and a seat installation must be incorporated into the vehicle during final assembly.

These modular units are often delivered parts, which must be joined in time-intensive fashion during final assembly, so that the through-put of vehicles in final assembly is adversely affected.

It is also a shortcoming that functional testing of safety-relevant components of the modular unit is often possible only in the vehicle.

The task of the present invention is to devise a modular unit for a convertible vehicle of the type just mentioned, with which the through-put in the final assembly of convertible vehicles can be increased when there are a number of components of different functionality, and with which functional testing of the safety-relevant components can be facilitated.

SUMMARY OF THE INVENTION

A modular unit for a convertible vehicle is therefore proposed that can be preassembled outside of the vehicle and inserted into the vehicle. The modular unit includes a transverse stiffening structure that, when installed, separates an occupant space from a rear stowage space.

The modular unit further includes a rollover protection system with a first module attached to the body of the vehicle, with guide devices for a second module that can be moved between a lowered rest position and an elevated support position with at least one rollover element, wherein a releasable holding device designed to hold the second module in its rest position, a locking device, by means of which the second module can be supported in a position deviating from its rest position automatically against a force acting in the direction of the rest position, and a drive system, by means of which the second module is biased in its rest position, and, as required, can be moved in the direction of its support position, are provided.

The modular unit according to the invention also includes seat elements and a safety or restraining belt system integrated into the first module that is attached to the vehicle, with belt guides for at least one restraining belt, and forms a standard unit that can be tested for functional capability outside of the vehicle.

The modular unit according to the invention therefore forms a compact unit, representing a single module, which can be completed outside of the vehicle and inserted in a single assembly step into the prescribed vehicle body. This separately completed unit, deliverable, for example, from external suppliers, can be simply mounted, preferably by screwing, but optionally also by welding, to the vehicle body and then need only be connected to corresponding connections for electrical and hydraulic supply and for data exchange with sensors and control devices of the rest of the vehicle.

In this way, final assembly of a vehicle is significantly accelerated and the throughput of completed vehicles is increased.

Moreover, by furnishing a multifunctional module according to the invention, a weight saving is achieved, since separate housing elements for the individual components, having specific functionalities, are no longer required.

The modular unit according to the invention is especially advantageous in terms of safety in that the cooperation of the seat elements and restraint belt system can be checked outside of the vehicle.

The combination of a convertible top with an externally produced transverse stiffening structure, in which the rollover protection system is also integrated, is especially advantageous, in that parts moved with the convertible top mechanism, which include the transverse stiffening structure, a seatback structure, and the rollover protection system, can be completed and checked together outside of the vehicle. This also applies to seat elements that cooperate with the rollover protection system.

Seat elements of the modular unit, in the simplest form, can represent seatback supports and seat bottom supports, as well as headrest mounts, which, depending on the configuration of the convertible vehicle, can be fastened to a two-seat or three-seat row of seats connected to the modular unit according to the present invention and, depending on the configuration of the seats, can even be fastened to the first module of the rollover protection system attached to the vehicle and/or to the transverse stiffening structure.

In an implementation of the modular unit according to the invention with a convertible top and a rear body cover, final assembly of the convertible vehicle is further simplified, in that both a multiple linkage for opening of the body cover, and drive devices for the body cover are integrated into the unit, so that convertible tops, whose movement is also included in the movement of the corresponding body cover, can be checked outside of the vehicle in the preinstalled state. In addition, additional assembly steps for the rear body cover are omitted. The rear body cover can be a pure convertible top cover or tonneau cover, or a combined convertible top cover-trunk cover.

In a particularly advantageous embodiment of the modular unit according to the invention a pass-through opening is arranged between the rear stowage space and the occupant space, which facilitates accommodation of bulky objects within the vehicle. The rear stowage space can be a convertible top stowage space, a pure luggage stowage space, or a combined convertible top and luggage stowage space.

The components of a safety belt system, like a belt winder and an upper safety belt guide, can be integrated into the components of the modular unit attached to the vehicle in the installed state via corresponding mounts that can be provided without special expense during production of the first module or the transverse stiffening structure.

The restraining belt system can then include not only safety belts for belting of adults, but also child seat restraining belts, in which an upper anchoring point for a child seat restraining belt, which is also referred to as a top-tether fastening, is also arranged in a particularly advantageous embodiment of the modular unit attached to the vehicle, especially the rollover protection system.

In an advantageous embodiment of the invention, a rollover protection device with a rollover element is allocated to each seat, in which the rollover protection devices of two vehicle seats of one row of seats are preferably arranged in the opposite direction, essentially off-center relative to the corresponding vehicle seat.

The rollover protection system therefore has a rollover protection device for each vehicle seat, which is driven independently of the rollover protection device of another seat, so that a tilting of the deployable module during its deployment movement, and therefore an adverse effect on functional safety can be avoided.

An off-center arrangement of the rollover protection devices, i.e., the fact that their components are arranged primarily in the region of a side of the corresponding vehicle seat facing a side of the vehicle, advantageously enables a sizable pass-through opening between the vehicle seats.

As an alternative or in addition, the rollover element can be designed bar-like in such a rollover protection system, having in its interior an axial receiving channel for a spring force accumulator of the drive system.

The bar-like configuration of the rollover element with an axial receiving channel for the spring force accumulator has the advantage that the spring force accumulator, which is required to move the rollover element, can be integrated into the rollover element, in which case an additional spring guide can be eliminated by shaping the internal contour of the rollover element according to the shape of the spring force accumulator.

The spring force accumulator can then be designed as a compression spring, which is supported on the first module fastened to the body and on the rollover element. Alternatively, however, a tension spring can also be provided, which is biased, for example, between a bar that extends into the interior of the rollover element coaxial to it and the rollover element held by the releasable holding device, so that the rollover element, after release by the releasable holding device, is transferred to an upper support position by the tensile force of the spring.

In an embodiment without any guide rods, a tension spring of this type can also be held on a pin attached to the body, which extends, for example, through a longitudinal slit into the interior of the rollover bar, so that the spring force accumulator is fully guided by the rollover element without an additional guide.

Guiding of the spring force accumulator by the rollover element is also possible with a compression spring, which is incorporated vertically under compression between a stop formed on the rollover element and a stop fixed to the body and extending through a recess in the rollover element, which can be designed, for example, as a pin with a spring retainer.

In this manner, a slim and compact design of the corresponding rollover protection device is achieved, which optionally, together with the off-center arrangement of the rollover protection devices, for example behind the rear seats, provides a large pass-through capability for bulky objects between a vehicle interior and a rear stowage space.

In another advantageous embodiment of the modular unit according to the invention, the rollover element of the rollover protection system is designed as a rollover bar, which spans substantially the width of the vehicle and is designed with a generally U-shaped configuration with a cross-arm and lateral arm elements.

To reduce the number of parts and increase the rigidity of the rollover bar, it is advantageous if the cross-arm and arm elements of the rollover bar are made in one piece.

If a central holding and release device and a synchronization device that synchronizes the movement of the arms of the rollover bar along the guide devices are provided for the rollover bar, a time-offset release of the arm elements of the rollover bar during its activation is prevented and the so-called drawer effect prevented, since a tilting or jamming of the rollover bar as a result of differences in driving arm elements during a deployment movement is avoided.

The synchronization device is preferably designed for this purpose with a synchronization shaft, which is mounted parallel to the cross-arm of the rollover bar in the installed state and is connected to each of the arm elements via a tooth profile that engages in a catch strip formed on the corresponding arm element. The synchronization shaft can then be designed according to the synchronization shaft described in DE 103 18 594 A1.

In a slim configuration of the guide devices of the rollover element on the first module, the guide devices may have a tubular profile, within which the rest position of the rollover element, at least one upper end area and in the support position a lower end area of the rollover element are accommodated.

For a further reduction of design space and weight, it can be prescribed, in an advantageous embodiment of the invention, that the tube profile forming a guide device of the rollover element be arranged with its lower edge spaced relative to a foot element of the first module. To connect the tube with the foot element of the first module, a connection fastened laterally to the tube can then be provided, which, for example, can be a U-profile or a box profile.

The guide devices of the first module attached to the vehicle, just like the elements of the deployable module, especially a rollover element, can be made from cost-effective extruded profiles.

For example, the tube serving as a guide device can be simply combined with additional functional elements, for example with a catch device of the locking device, which can be supported on the tube. In a cost-effective embodiment, the tube can have a peripheral recess to accommodate the catch device of a locking device supported on it, in which the catch device is held in shape-mated fashion on the tube in the direction of movement of the rollover element and is not further connected to the tube.

The releasable holding device for holding the second module with the rollover element in its rest position can, in principle, be of known design and can include, for example, a locking element mounted to pivot around a fixed axis of rotation, which is formed with a detent section, which engages in the rest position of the rollover element with a mating element on the rollover element. The locking element, during an accident signal, can be pivoted by means of an actuator, so that the detent section is disengaged from the mating element to transfer the rollover element into its support position.

This type of configuration of the releasable holding device and the rollover protection device equipped with it permits a reliable and cost-effective locking of the rollover element in its rest position, in which the holding device can be advantageously produced with few components that can be manufactured without the high precision expenses associated with precision manufacturing.

Another advantageous embodiment of the invention provides that the pivotable locking device, which engages with a locking element and mating element of the second module in the rest position of the rollover element and releases the rollover element for deployment into its support position in the event of an accident, be secured in the rest position by a fusible insert of the actuator that can be melted in the event of an accident.

The use of a fusible insert to hold a locking element and to eliminate the locking position in the event of an accident simply and cost-effectively guarantees reliable and rapid release of the rollover element. If only the locking element, engaged with the mating element and mounted to pivot in the rest position of the rollover element, need be held by the fusible insert, the fusible insert can be designed for much lower forces than would be necessary for direct holding of the second module or rollover element. The correspondingly reduced dimensioning of the fusible insert permits rapid melting and therefore severing of the components connected thereto, so that a release of the rollover element can occur in a very short time.

The fusible insert, in principle, can have any shape and be designed, for example, plate-like or rod-like or wire-like. The pivotable locking element can also be configured, in principle, in any shape in the holding device of the rollover protection system according to the invention.

In an advantageous embodiment of the invention, a blocking element can be arranged between the locking element and the actuator, which holds the locking element in a blocked position. It can then be prescribed that the blocking element in the block position be biased with an energy accumulator against a seat held by the meltable fusible insert of the actuator. When an accident is recognized, the seat of the blocking element can be instantaneously eliminated by a melting of the fusible insert, so that the biased blocking element can move in the direction of the eliminated seat and release the locking element.

In an embodiment without a separate blocking element, the locking element can, for example, be forced radially directly against a seat held by a meltable fusible insert in the rest position of the system. If the tensile force of the biased rollover element or a bias element, on the other hand, engages the locking element in the direction of rotation, by eliminating the seat as a result of melting of the fusible insert, the rotational movement of the locking element that releases the holding device is made possible.

In another advantageous embodiment, the locking element can be connected in the rest position radially in the direction of rotation to a base element by a fusible insert so that it exerts a tensile force relative to the base element, in which the base element carries one end of the fusible insert and the locking element the other end of the fusible insert.

In another advantageous embodiment of the invention, the locking element in the rest position can also be held in a stop position, from which it can be transferred to a rotation position, in the event of an accident, by an actuator with a pyrotechnic propellant charge.

The described configurations of a releasable holding device and the rollover protection device equipped with it according to the invention all permit reliable and cost-effective blocking of the rollover element in its rest position, in which the holding device can advantageously be made with few components and without high precision.

The locking device, in a modular unit equipped according to the present invention, has at least a first catch device, which can be brought into effective connection with a second catch device to support the second module, and which permits movement of the second module, starting from its rest position, in the direction of its support position.

The first catch device may have a detent with a tooth profile, whereas the second catch device is designed with a catch strip adapted to the geometry of the tooth profile of the first catch device. The detent is then preferably spring-loaded in the direction of the catch strip.

In another embodiment of the invention, the locking device can be designed for automatic locking of the deployable second module in its partially or fully deployed position with a first and second catch device, in which one of the catch devices is connected to one of the modules and has a blocking element mounted eccentrically around an axis of rotation and designed with a tooth profile, and in which the other catch device is designed as a surface of the other module facing the blocking element, with which the tooth profile is in frictional engagement in an effective position of the blocking element, in which movement of the second module in the direction of its rest position is prevented.

A locking device configured in this way has the advantage of simple design with few components to be manufactured without high precision requirements.

The second catch device of the rollover protection system according to the invention can therefore be designed as a simple surface of a component of one of the modules, which is available without further manufacturing steps, whereas in ordinary rollover protection systems, costly catch devices made with tooth profiles are provided, which must be engaged with a tooth profile of a detent to lock the rollover protection system.

In an embodiment of the rollover element as a rollover bar with a synchronization shaft that synchronizes the displacement movement of the arm elements, and which engages with catch strips of the arm elements, the locking device can advantageously be configured such that a catch element of the first catch device is designed as a tooth profile element, which, in the locked operating state of the locking device, is effectively connected to both the synchronization shaft and to at least one of the locked catch strips of the arm elements.

The locking device is therefore arranged in a region of the modular unit that is occupied in the rest position of the second module by the rollover bar in the transverse direction of the vehicle, so that a large pass-through opening can be provided between the guide devices of the arm elements. In addition, with this configuration of the locking device, which utilizes the components of the synchronization device, the number of components is reduced.

Further advantages and advantageous embodiments of the modular unit according to the invention can be deduced from the description, the drawing and the claims.

Several practical examples of a modular unit of a convertible vehicle according to the invention are shown in schematically simplified fashion in the drawing and are further explained in the following description, in which the same reference numbers are used for components of the same design and function in the interest of clarity.

DETAILED DESCRIPTION ON THE PREFFERED EMBODIMENT

Figure 1:
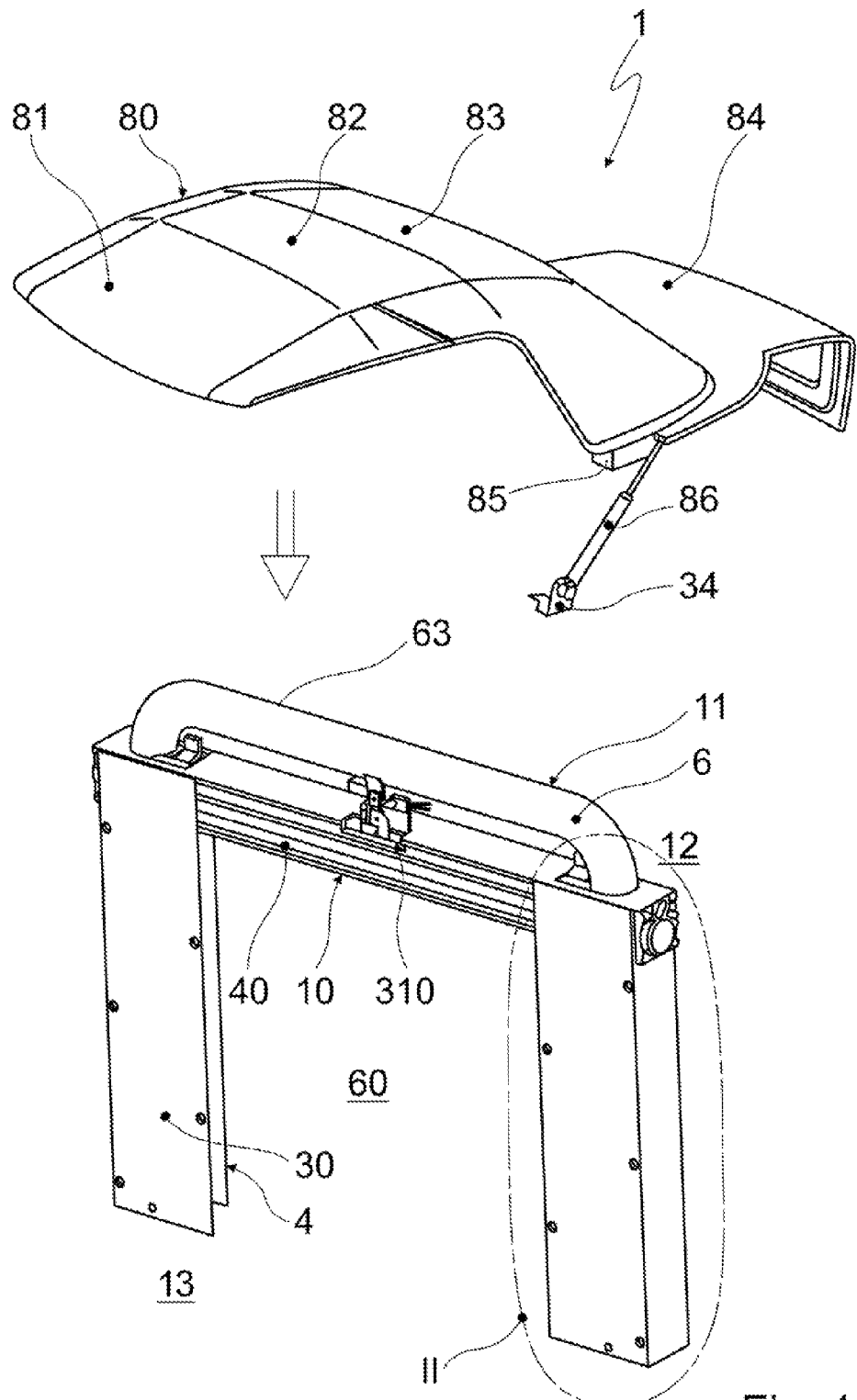
FIG. 1 is a simplified, exploded and partially enlarged perspective view of a modular unit for a convertible vehicle.
Figure 2:
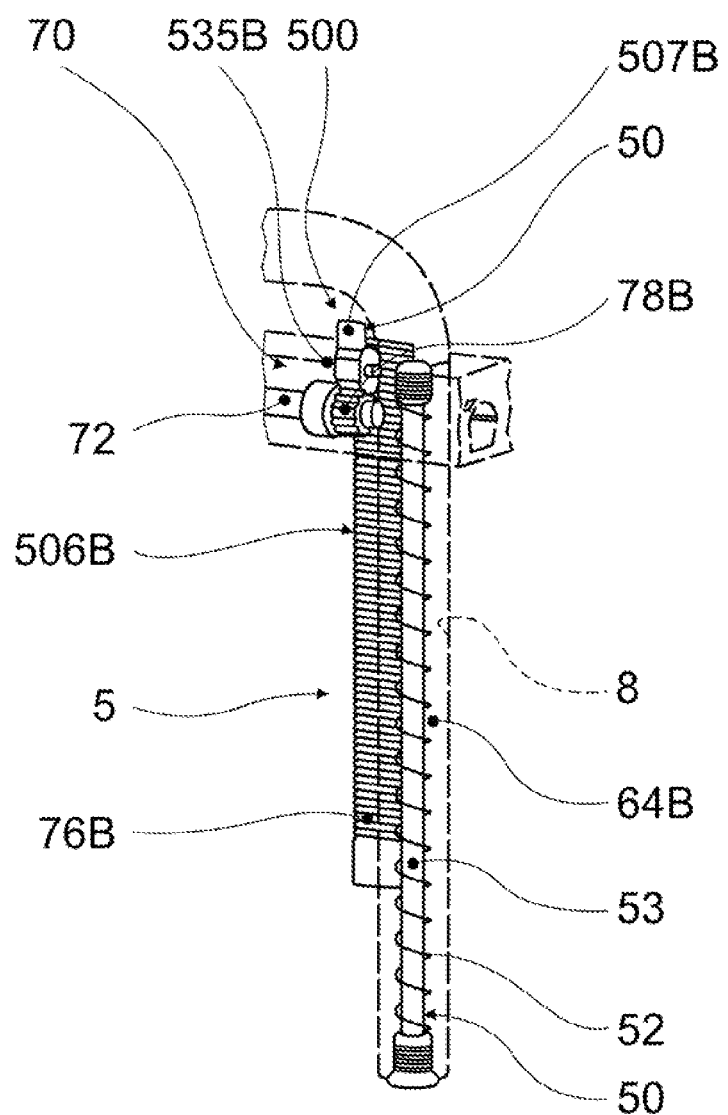
FIG. 2 is an exposed region II, further characterized in FIG. 1.
Figure 3:
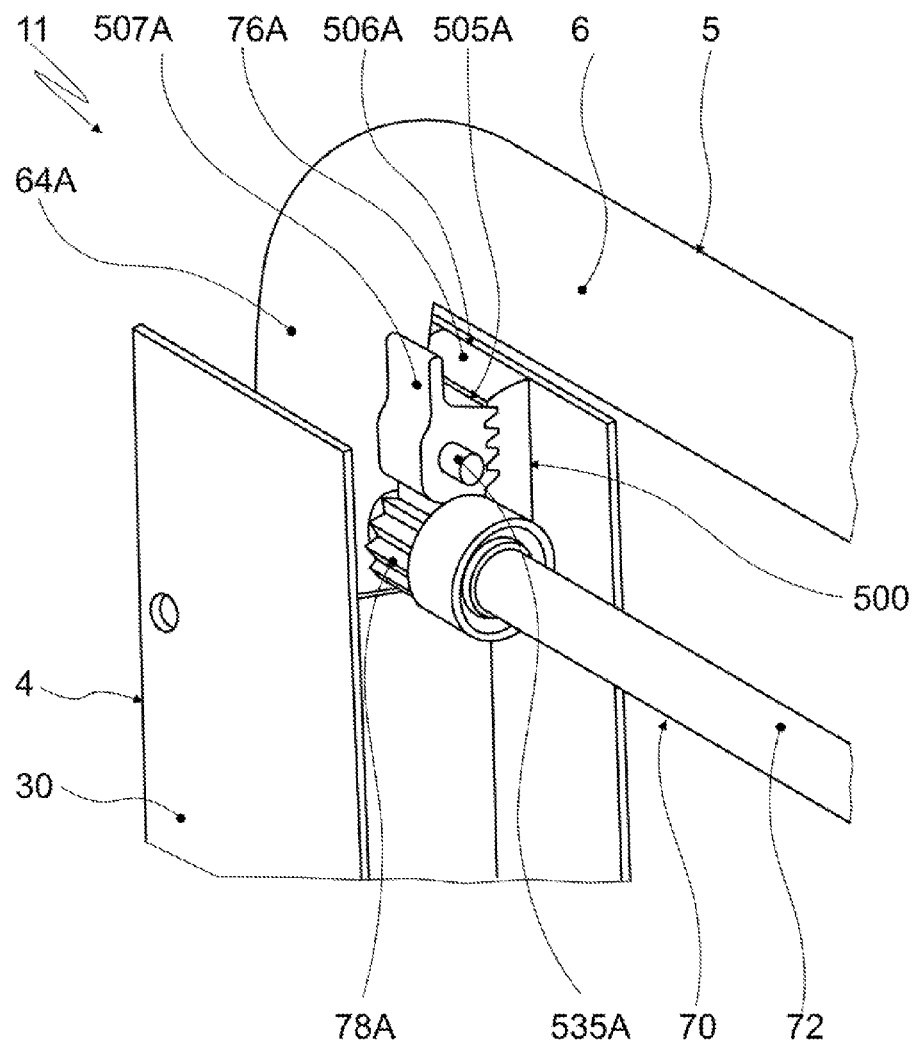
FIG. 3 is perspective view of a portion of a locking device of a rollover protection system of the modular unit according to FIG. 1.

Referring to FIGS. 1 to 3, a first modular unit 1 for a convertible vehicle is shown, having a transverse stiffening structure 10, which, in the installed state in a body of the convertible vehicle, separates an occupant space 13, indicated symbolically with respect to its position in FIG. 1, from a rear stowage space 12.

The transverse stiffening structure 10 is designed in one piece with a rollover protection system 11, which has a first module 4 attached to the auto body with guide devices 30 for a second module 5. The second module 5 is moveable between a lowered rest position and an elevated support position, with a rollover element 6 designed here as a rollover bar.

The rollover bar 6 extends in the vehicle transverse direction substantially over the vehicle width and is designed roughly U-shaped in the embodiment depicted in FIG. 1 with a cross-arm 63 and lateral arm elements 64A, 64B, in one piece. The arm elements 64A and 64B each cooperate with one of two guide devices 30 of the first module 4 with the same design and are moved in a deployment movement of the second module 5 in a movement direction, shown by an arrow Z in FIG. 1, starting from the depicted rest position.

Figure 10:
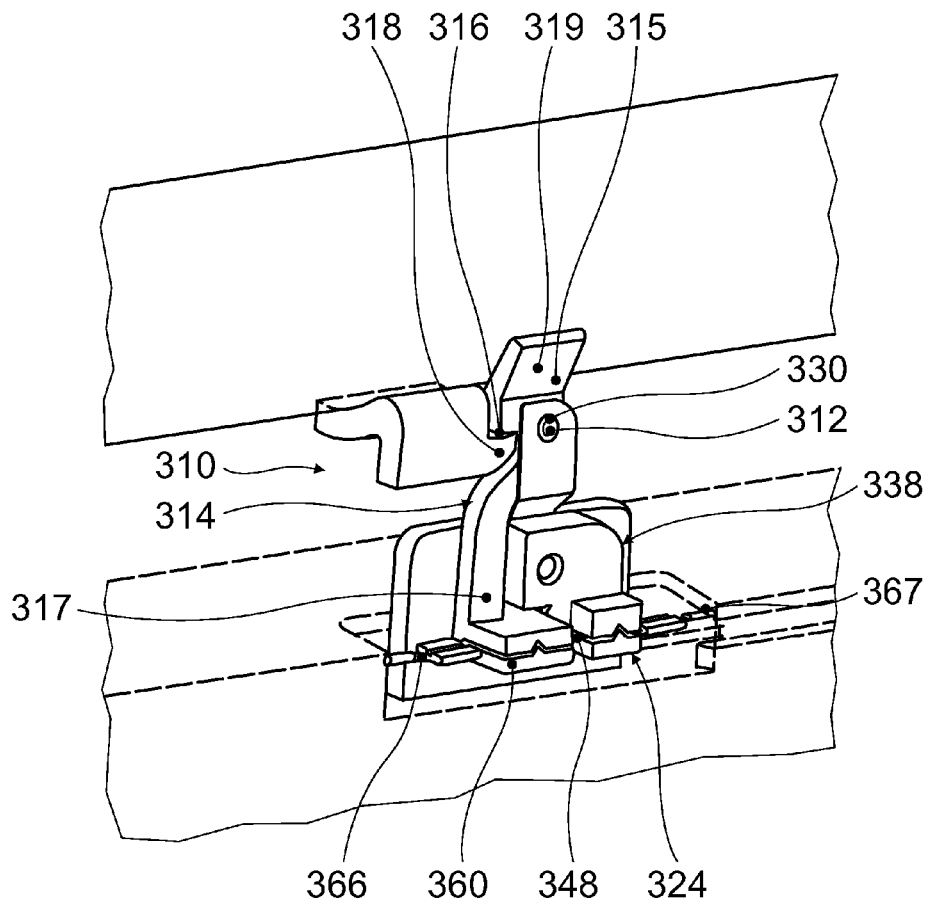
FIG. 10 is a simplified, exposed, three-dimensional view of a holding device for the rollover protection system according to FIG. 1 or FIG. 6.

A central holding device 310 is provided to hold the second module 5 in its rest position, which here is arranged in the center on a transverse support 40 that connects the guide devices 30 of the module 4 of the rollover protection system 11 attached to the vehicle and forms the transverse stiffening structure 10 with the first module 4 attached to the body, and is further shown in FIG. 10.

In addition, the rollover protection system 11 includes a locking device 500, further depicted in FIG. 2, for example, by means of which the second module 5 is automatically supported in a position deviating from its rest position against a force acting in the direction of the rest position.

To move the rollover bar 6 into its support position, a drive system 50 is provided, which here is designed with a spring force accumulator 52, further shown in FIG. 2, for example, and by means of which the second module 5 is biased in its rest position.

The rollover protection system 11 encloses a pass-through opening 60, which is arranged beneath the transverse support 40 that runs parallel to the cross-arm 63 of the rollover bar 6 between the arm elements 64A, 64B of rollover bar 6 and its guide devices 30.

The rollover protection system 11, together with the transverse stiffening structure 10 and a convertible top 80, shown sketched in FIG. 1, forms a unit that is preassembled and completed outside of the vehicle and then inserted into the vehicle.

The present convertible top 80 includes collapsible roof segments 81, 82, 83 and a rear body cover 84, which form a combined convertible top cover and trunk cover, which can be opened in two directions. The convertible top 80 is mounted with a main bearing 85 on the transverse stiffening structure 10 and, in the present case, has a hydraulic drive system 86, which is mounted with a foot element 34 on the transverse stiffening structure 10.

The depicted convertible top 80, in the present case, may be a convertible top of any design, which can be either a soft top or a hardtop, and can have two or three roof segments, which can be driven hydraulically or electrically via active linkages.

As can be deduced from FIG. 2 to FIG. 6, the rollover protection system 11 has a synchronization device 70 that synchronizes the displacement of the arms 64A, 64B of the rollover bar 6 along the guide devices 30.

The synchronization device 70 is designed with a synchronization shaft 72, which is fixed parallel to the cross-arm 63 in the installed state in the transverse support 40 designed as a hollow extruded profile, and is connected to each of the arm elements 64A, 64B via a tooth profile or gears 78A, 78B, which engages in a catch strip 76A, 76B formed on the corresponding arm element 64A, 64B.

The locking device 500, by means of which the second module 5 is supported downward in any position deviating from its rest position, has a first catch device 505A or 505B in the region of each arm element 64A, 64B, respectively, which can be effectively connected to a second catch device 506A or 506B for support of the second module 5 and the rollover bar 6, and which permits movement of the rollover bar 6 in the direction of its support position.

Figure 4:
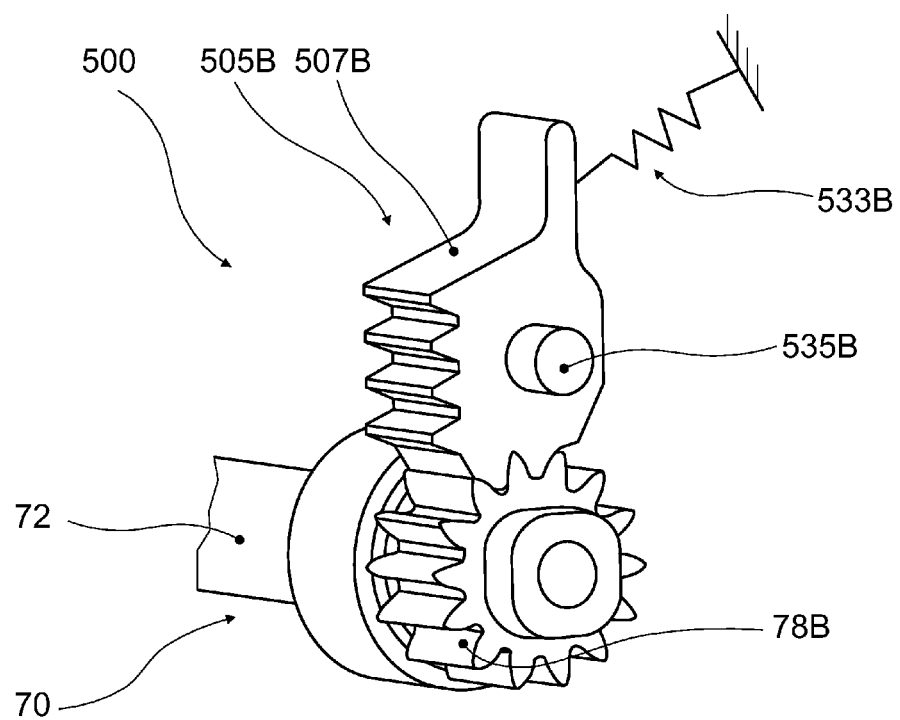
FIG. 4 is a perspective, detailed view of elements of the locking device of FIG. 3.

The first catch devices 505A, 505B, depicted in FIG. 3 and FIG. 4, each have catch elements 507A, 507B, which are designed as tooth profile elements, and in the locked operating state of the locking device 500, are effectively connected simultaneously to the tooth profile of the synchronization shaft 72, formed by gears 78A, 78B arranged non-rotatably on the synchronization shaft, and to the catch strips 76A, 76B in a manner further depicted in the drawings and which locks the locking device 500.

In the unlocked operating state of the locking device 500, the catch elements 507A, 507B of the first catch devices 505A, 505B are effectively connected to gears 78A, 78B of the synchronization shaft 72 and disengaged from the catch strips 76A, 76B, so that the rollover bar 6 can deploy unhampered into its support position.

As an alternative to this, it can also be prescribed that the catch elements 507A, 507B, in the unlocked operating state of the locking device 500 not be effectively connected either to the synchronization shaft 72 or to one of the catch strips 76A or 76B.

Figure 5:
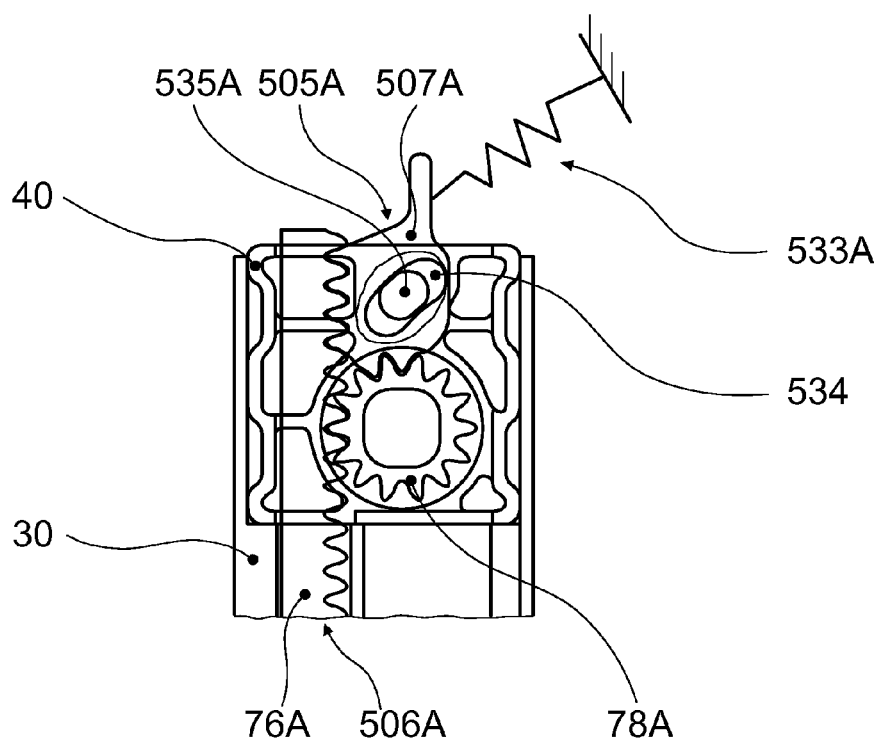
FIG. 5 is a schematic side view the locking device according to FIG. 4 in a schematized side view.

Since the two gears 78A, 78B of the synchronization shaft 72 are engaged in the catch strips 76A and 78B, the gears 78A, 78B are placed in rotation during deployment of the rollover bar 6 and the catch elements 507A, 507B of the first catch devices 505A, 505B against the spring action of the spring devices 533A, 533B, depicted in FIG. 4 and FIG. 5, are disengaged from the catch strips 76A and 76B, representing the catch elements of the second catch devices 506A and 506B.

The catch elements 507A, 507B are disengaged in controlled fashion from the catch strips 76A and 76B, in which the catch elements 507A, 507B are each firmly connected to a guide element 535A, 535B, which can be moved in an at least roughly arc-like control cam 534. The control cam 534 is formed in a component connected firmly to the transverse support 40 or to the guide devices 30 or in the component itself.

In order to avoid a rotation of the catch elements 507A and 507B relative to the synchronization shaft 72 and the gears 78A, 78B, the guide elements 535A, 535B are designed roughly ellipsoid in the manner shown in FIG. 5. The catch elements 507A, 507B, during a rotation of the synchronization shaft 72, therefore follow the curve paths stipulated by the control cams 534 and are either disengaged from the catch strips 76A and 76B or engaged therewith without rotation.

The length of the control cams 534 is dimensioned such that the catch elements 507A and 507B, in the event of release of the rollover protection system 11 by the gears 78A, 78B, are initially disengaged from the catch strips 76A and 76B. On further rotation of the gears 78A, 78B, the catch elements 507A and 507B are additionally disengaged from the gears 78A, 78B, so that the catch elements 507A and 507B experience no additional control displacement and/or tilting, whereas the gears 78A, 78B, with their teeth, are passed by the corresponding tooth profiles of the tooth catch 507A and 507B.

When the rollover bar 6 is stopped, the catch elements 507A and 507B are forced in the direction of the gears 78A, 78B by the spring devices 533A, 533B, whose force directions are preferably at least roughly parallel to the trends of the control cams 534, so that the catch elements 507A and 507B, in any case, are in an effective position, so that, during a force acting on the rollover bar 6 in the direction of its rest position, they immediately reengage with the gears 78A, 78B. It is therefore ensured that the catch elements 507A, 507B, during an initial movement of the rollover bar 6 in the direction of its rest position and a rotation of the gears 78A, 78B corresponding to it, are immediately engaged with the catch strips 76A and 76B and the locking device 500 is transferred to its locked operating state, so that an undesired retraction of the rollover bar 6 in the direction of its rest position is avoided.

Figure 6:
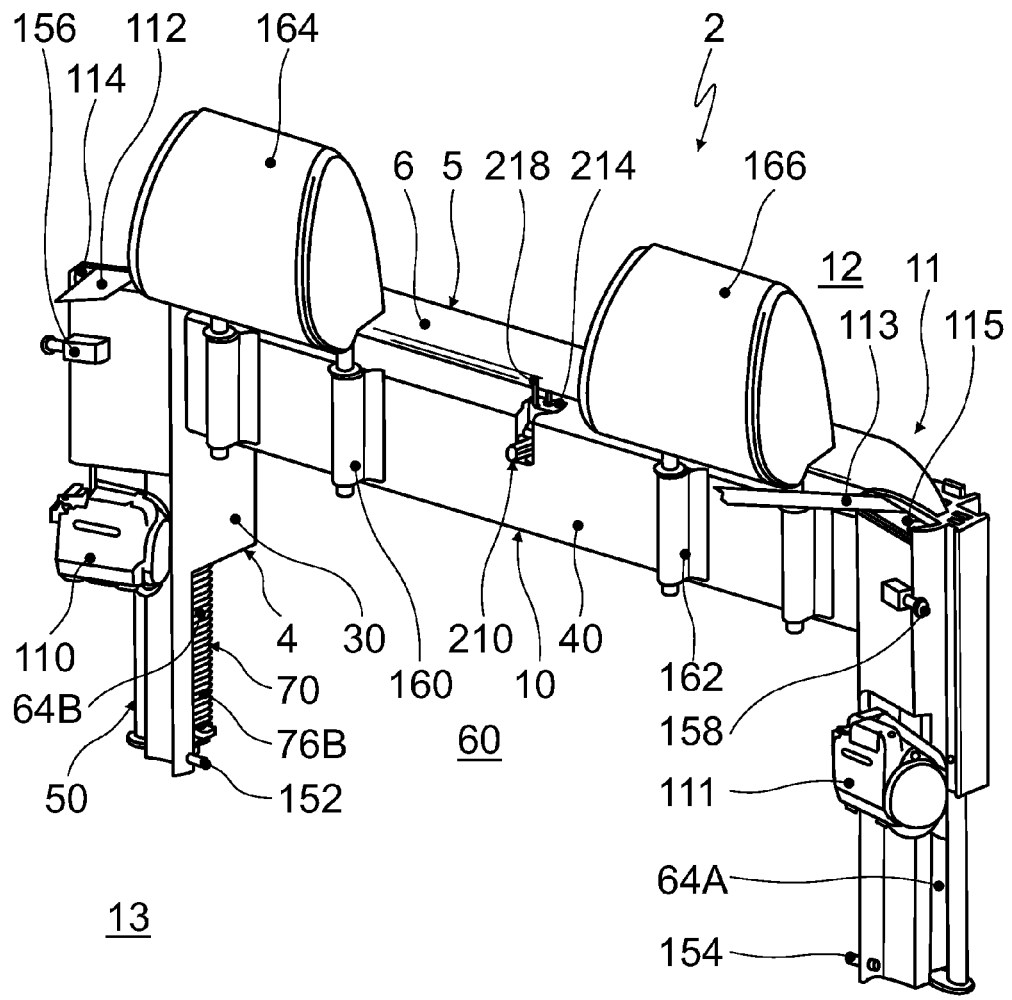
FIG. 6 is a simplified, perspective view of another modular unit for a convertible vehicle.
Figure 7:
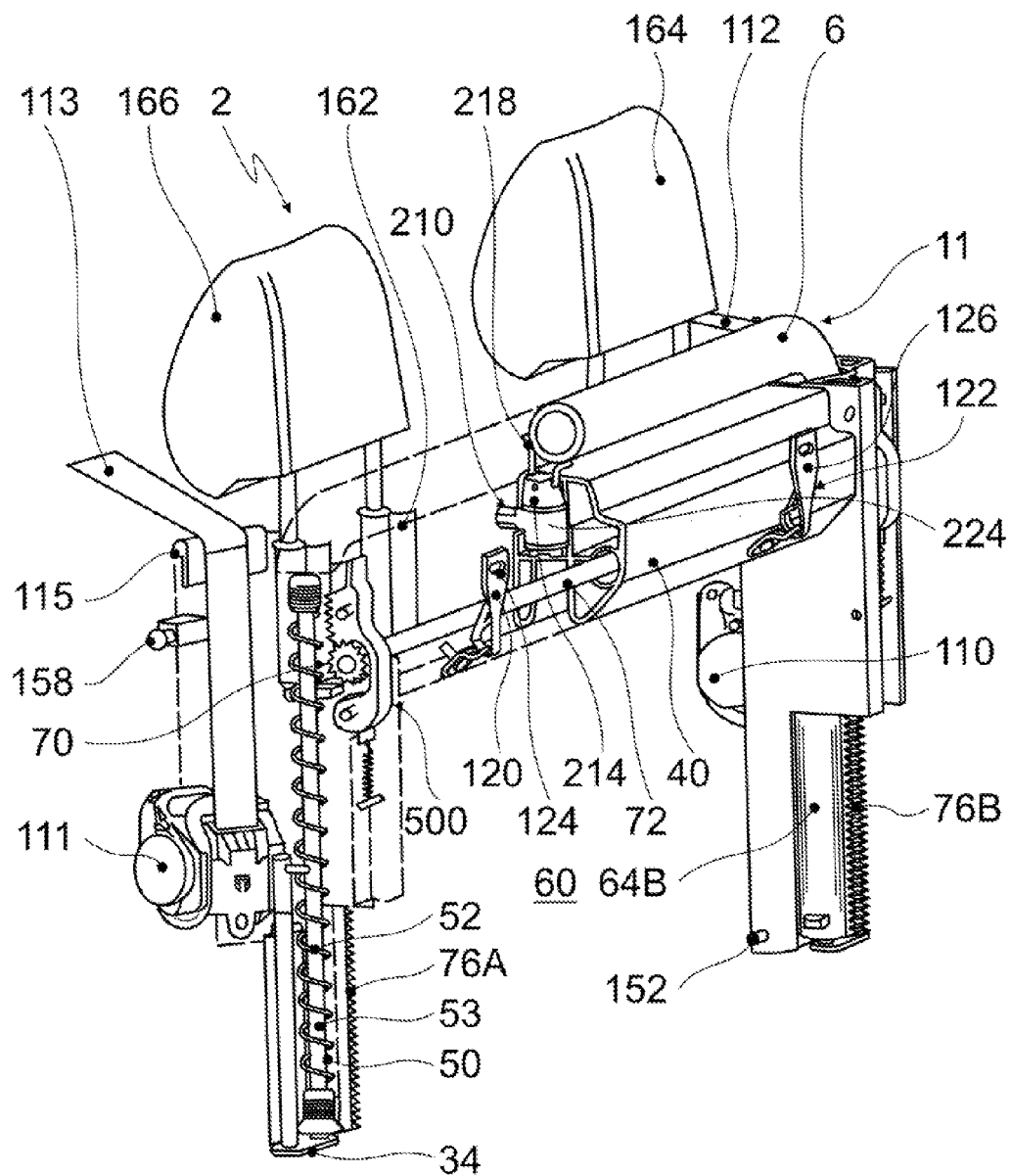
FIG. 7 is a perspective rear view of the modular unit of FIG. 6.

FIG. 6 and FIG. 7 show another modular unit 2 for a convertible vehicle, which, like the first modular unit 1, has a rollover protection system 11 with the corresponding components and a transverse stiffening structure 10, and can be connected with a convertible top 80 into a preinstalled unit.

Moreover, modular unit 2, completed outside of the vehicle, also includes seat elements in the form of lower seatback supports 152, 154 and upper seat back locking pins 156, 158, as well as headrest supports 160, 162, each with a corresponding head support 164 and 166 for a first vehicle seat 26 and a second vehicle seat 28 of a row of seats, which, in the present case, represent the back seats.

The seat elements, which in this case are fastened to the guides 30 of the rollover protection system 11, which are attached to the vehicle, and to the transverse support 40 of the transverse stiffening structure 10, can also include complete seatbacks or seat lower parts in additional embodiments, which, as part of the rollover protection system 11, can optionally be controlled by it in the event of an accident, in a manner that places the occupants situated thereon into a protective position in the event of an accident.

The modular unit 2, which therefore also represents a multifunctional module, has, in addition to the functionalities of the rollover system 11, the pass-through opening 60 and the seat connection, a restraining belt system 100, which, together with the other components of the multifunctional module, is completed separately outside of the vehicle in its proposed compact design and can be mounted in a vehicle for final assembly.

In the embodiments depicted in FIG. 6 to 9, the restraining belt system 100 is integrated into the first module 4 of the rollover protection system 11, which is attached to the vehicle, or into its guide devices 30, wherein a belt winder 110, 111, at the middle height of the guide devices 30, is inserted in known fashion into a profile area 35 mounted in front of the rollover element 6 in the vehicle front direction of the guide devices 30, designed as a hollow profile.

The corresponding safety belt 112 or 113 is guided by this belt winder 110, 111 in the profile area 35, designed as a hollow profile, to an upper safety belt guide or deflection 114 or 115. From there, the safety belt 112, 113 extends in the vehicle forward direction over a backrest of a vehicle seat mounted in front of the area 35 of the rollover protection system 11 and can be connected in the usual manner to a safety belt lock by a vehicle occupant.

In addition, the depicted restraining belt system 100 includes two upper anchoring points 120, 122 for a child safety seatbelt, in which the upper anchoring points 120 and 122 are each fastened to a profile wall 46 of the transverse support 40 that faces away from the occupant space 13, and have a bracket 124 or 126, through which a belt fastened to a child safety seat may be attached. The upper anchoring point 120 or 122 for a child safety seat, which ordinarily is attached to two fastening points in the seat base area, therefore forms a third fastening point.

With respect to the functionality, the rollover protection system 11 of the modular unit 2 is similar to that of the first modular unit 1.

The second modular unit 2 has a modified holding device 210 for the rollover bar 6. The holding device 210, arranged centrally on the transverse support 40, includes a locking element 214 mounted to pivot around a fixed axis of rotation, which element is designed to cooperate with a hook-like mating element 218 on the rollover bar 6.

The locking element 214 can be pivoted by means of an actuator 224 out of engagement with the mating element 218, in which the actuator 224 is driven by a control device, not shown, in the event of an accident recognized by a safety sensor mechanism of the convertible vehicle, and experiences a state change in the event of an accident, which results in a movement of the locking element 214.

The actuator 224 is designed here as an electromagnetic actuator of the usual design, but actuators operating according to another action principle are also suitable, such as piezoelectric actuators, pyrotechnic actuators or actuators equipped with a fusible insert, for use in the holding device 210.

The locking device 500 for locking the rollover bar 6 in the support position is modified only slightly in the embodiment according to FIG. 6 to FIG. 9 relative to the embodiment according to FIG. 1 to FIG. 5, for which reason the differences are described in the subsequent description and otherwise the preceding description is referred to.

Figure 8:
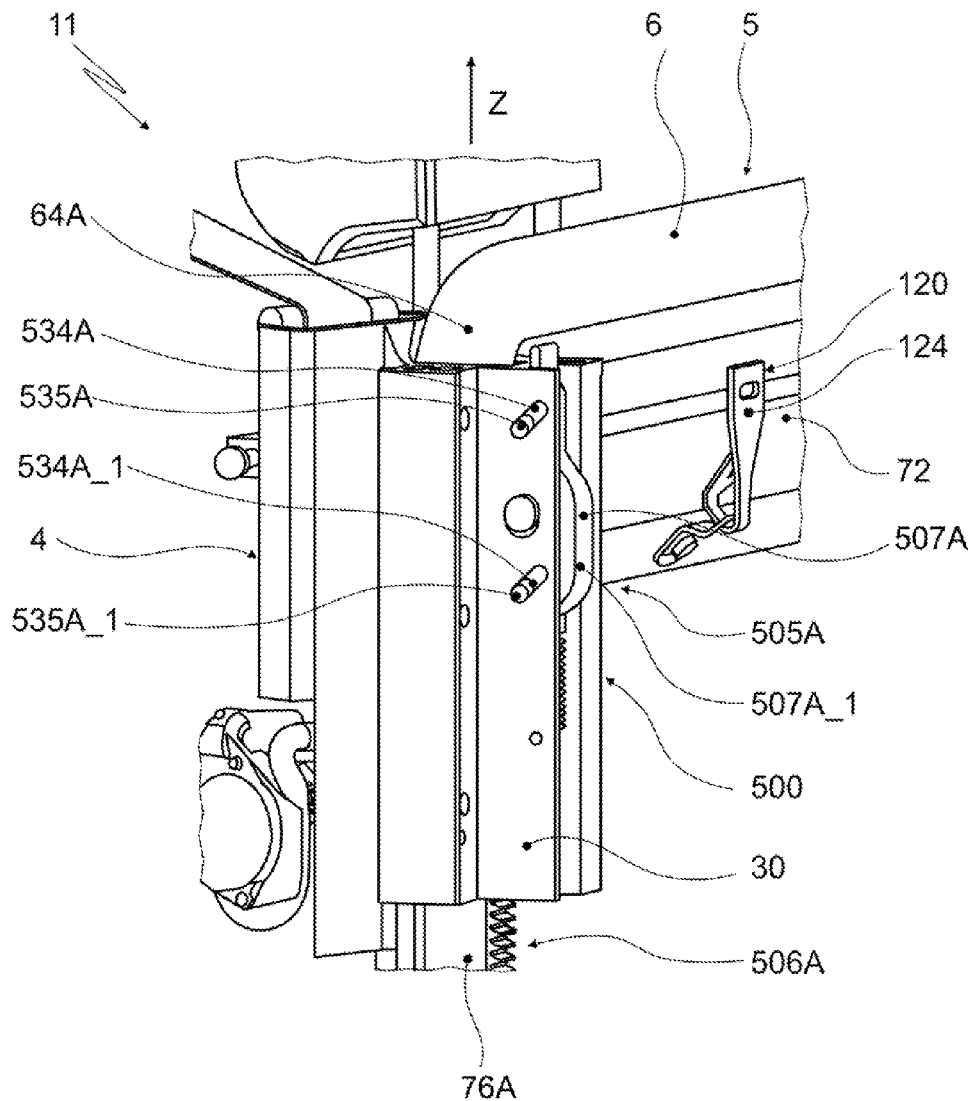
FIG. 8 is perspective view of a locking device of the rollover protection system of the modular unit according to FIG. 6 and FIG. 7.
Figure 9:
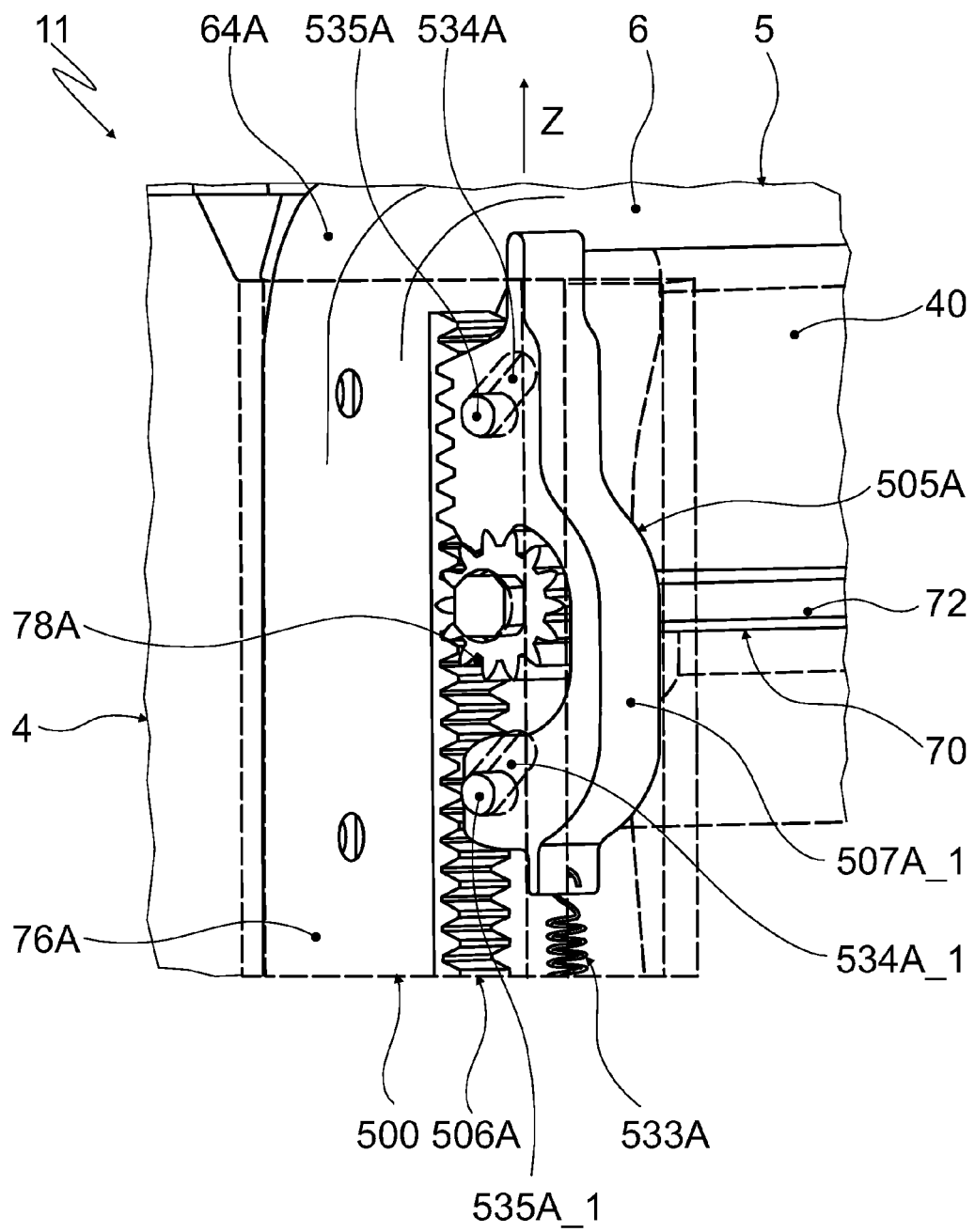
FIG. 9 is a perspective view of the locking device according to FIG. 8 in an exposed view.

The catch element 507A of the catch device 505A, depicted in FIG. 8 and FIG. 9, corresponds, in an area arranged above the gear 78A in the deployment direction Z, of the rollover protection system 11. With this area, an alternate catch element 507A_1, designed clamp-like, is connected, which engages the gear 78A of the synchronization device 70 in the form of a semi-arc and engages with an additional guide element 535A_1 in another control cam 534A_1, so that the catch element 507A_1, with reference to the deployment direction Z of the rollover bar 6, is controlled, both above and beneath the gear 78A in the control cams 534A and 534A_1 and can be disengaged from the catch strip 76A.

The spring device 533A is designed here as a tension spring, which engages on an end of the catch element 507A_1 of the catch element 507A_1 that faces away from the gear 78A. The force direction of the spring device 533A on the catch element 507A_1 is directed against the deployment direction Z of the rollover bar 6, so that the catch element 507A, in the same manner as the catch element 507A of the first practical example of the rollover protection system 11, depending upon a rotation of the synchronization shaft 72, is engaged with or disengaged from the catch strip 76A, and the locking device 500 is transferred to a locked or unlocked operating state.

In order for the second module 5 to be lowered back into its rest position, in which the second module 5 is preferably lowered with reference to a seat back of the vehicle seat, so that the second module 5 does not protrude beyond the seat back, from its support position, in which the second module 5, with its rollover bar 6, protrudes above a seat area of one or more vehicle occupants, so that a survival space is provided for the vehicle occupants during a vehicle rollover by the protection element in known fashion, the effective connection between the catch devices 505 and 506 can be removed again, for example, by an appropriate release element for the intended lowering movement of the second module 5 in the direction of its rest position.

Figure 11:
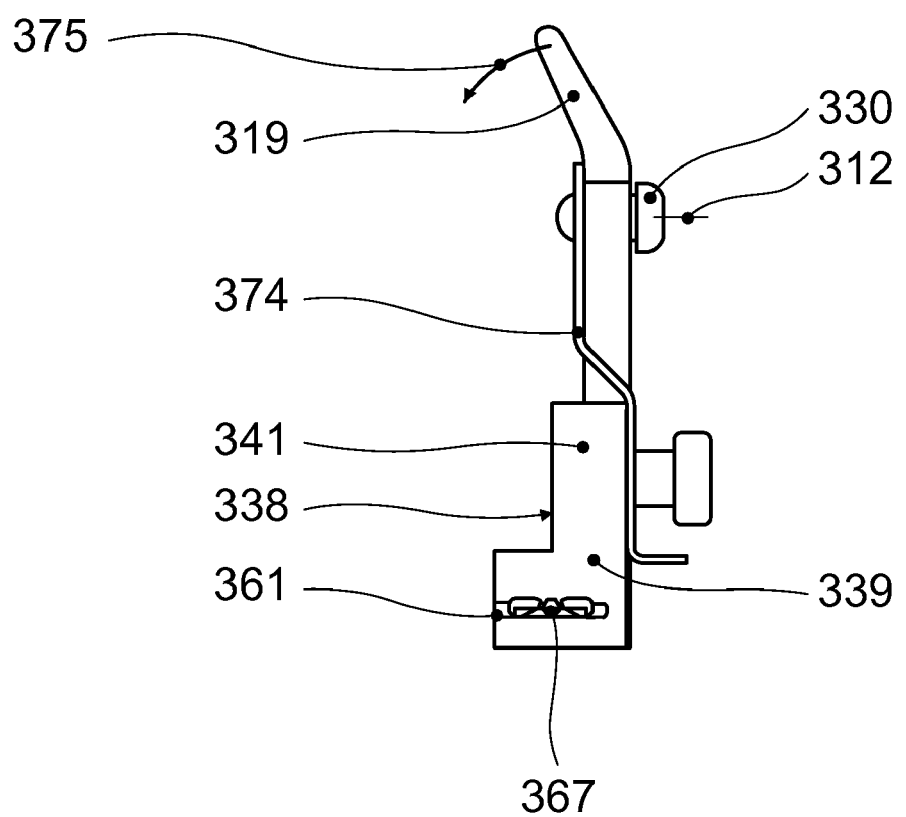
FIG. 11 is a simplified, side view of the holding device of FIG. 10 after release of a rollover element of the rollover protection system.
Figure 13:
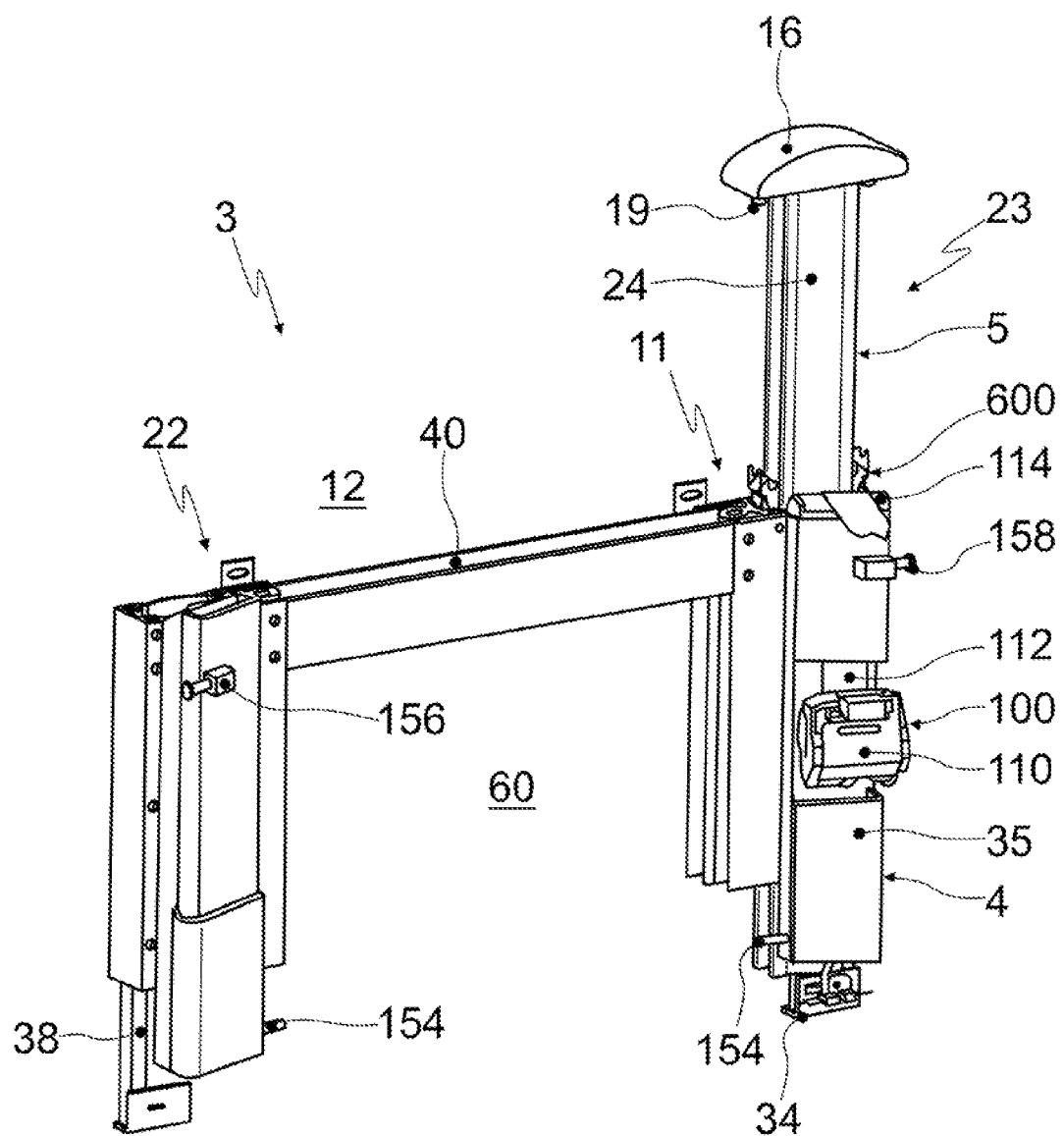
FIG. 13 is a simplified, perspective sketch of another modular unit according to the invention.
Figure 14:
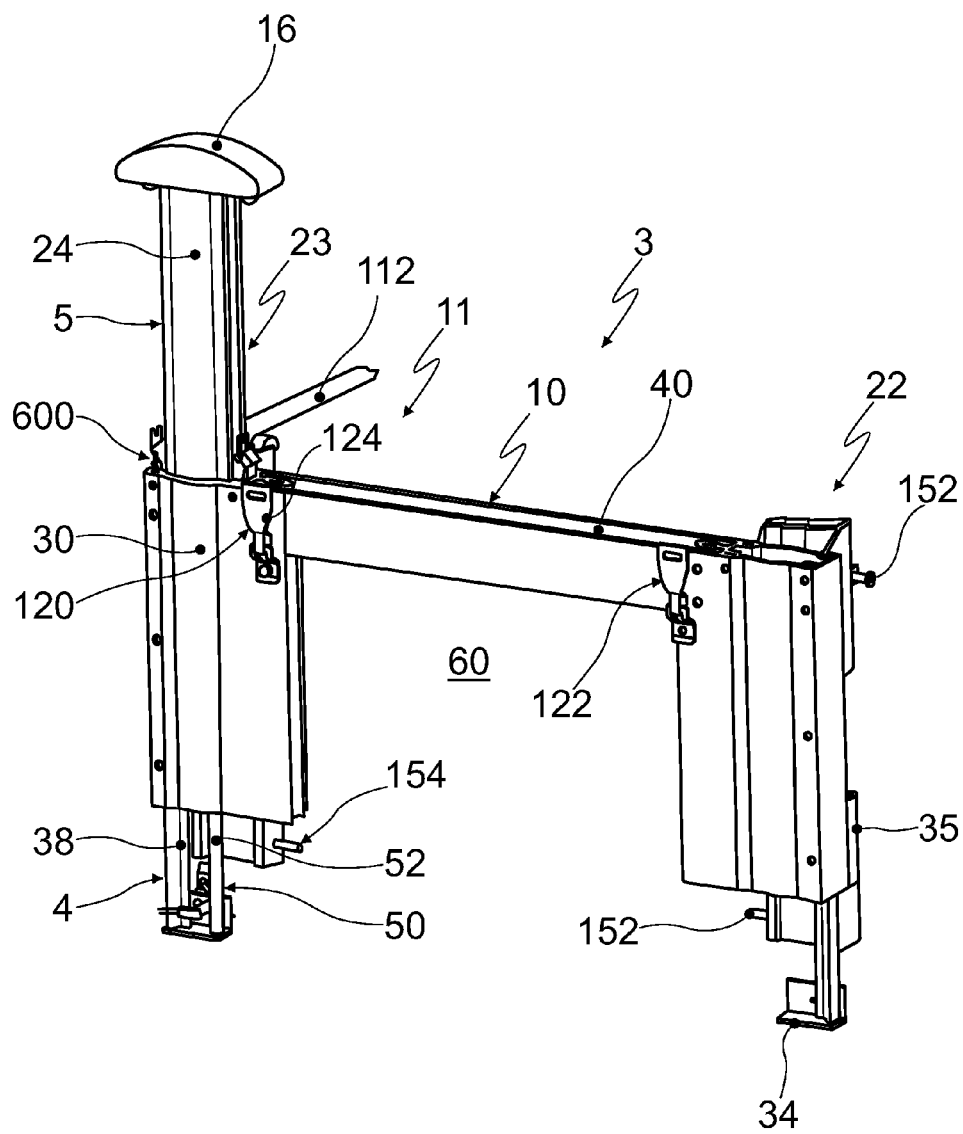
FIG. 14 is a rear view of the modular unit of FIG. 13.

FIG. 10 and FIG. 11 show, in a simplified view, the holding device 310 equipped with a fusible insert 348 for holding the rollover element 6 of the embodiment of the rollover protection system 11 according to FIG. 1 to FIG. 5, which, however, is also suitable for the rollover protection system 11 according to FIG. 6 to FIG. 9 and finds almost identical application in the embodiment according to FIG. 13.

The holding device 310 includes a locking element 314 mounted to pivot around a fixed axis of rotation 312, which has a detent section 316 on its periphery, which is formed as a U-shaped recess and is designed to cooperate with a mating element 318 on the rollover bar 6.

The mating element 318 can be designed here in simple fashion as a holding tab beneath a recess on the rollover bar 6, or also as a pin, a shoulder, or a hook element.

In the embodiment according to FIG. 10 and FIG. 11, the mating element 318 is designed as a hook element, which is fastened to a lower edge of the rollover bar 6. The hook element 318 and the detent section 316 of locking element 314 are adjusted to each other, so that the locking element 314, during rotation around its axis of rotation 312, can be disengaged without difficulty from the mating element 318.

The rollover bar 6 is held in its lowered rest position by engagement of the locking element 314 with the mating element 318 and can be released by activation of an actuator 324, in which the actuator 324 permits a rotation of the locking element 314, at least in areas, to disengage the locking element 314 from the mating element 318.

In the embodiment according to FIG. 10 and FIG. 11, the locking element 314 is held in its rest position, to lock the rollover bar 6 in the rest position by a fusible insert 348 of the actuator 324 that can melt in the event of a accident, in which the locking element 314 is connected in the rest position radially and under tension to a base element 338 via the fusible insert 348.

The locking element 314, in this practical example, is designed lever-like in the fashion of a pivot lever. One lever end 315 has the detent section 316 for engagement with the locking element/mating element 318 and the other lever end 317 has a mount 360 for the fusible insert 348, which is connected to an energy supply device 366.

The base element 338 is a block element with an essentially L-shaped cross-section, in which one L-arm 339 has a mount 361 for the fusible insert 348 with an energy supply device 367, and the other L-arm 341 carries a bearing 374 of the pivotable locking element 314 with its cap bolt 330.

The bearing 374 represents a support plate, non-rotatably mounted to the L-arm 341 of the base element 338, which is mounted right against one side of base element 338 and is bent S-shaped opposite the cap bolt 330 of the locking element 314, so that the locking element 314, the support plate 374 and the cap bolt 330, in the axial direction of the cap bolt 330, have an extension that essentially corresponds to the depth of the base element 338 to be axially covered with this assembly. The holding device 310 therefore advantageously has a very limited design depth.

The mounts 360, 361 for the fusible insert 348 are designed here as grooves, into which the plate-like fusible insert 348 is firmly locked. The fusible insert 348 can have a shape adjusted to the grooves that secure it for locking and a cross-sectional narrowing in its middle area for more rapid melting.

The energy supply device 367 designed to produce the heat necessary for melting the fusible insert 348 includes a clamp fastened to the ends of the fusible insert 348 and connected to a current source.

The material of the fusible insert 348 can represent any metal and/or plastic material known for fuses.

During melting and severing of the fusible insert 348 as a result of current supply, which is adjusted by a control device during a recognized accident situation, the biased rollover bar 6 is released by the locking element 314, in which the locking element 314, because of the tensile load, is pivoted by the deploying rollover bar 6, the detent section 316 being disengaged from a mating element 318, shown as a shoulder.

Reversal of the rollover protection system, with a return of the deployed rollover bar 6 to its lowered rest position, can occur in the practical example according to FIG. 10 and FIG. 11 simply by lowering the rollover bar 6 into its rest position, in which the rollover bar 6 initially encounters a slope 319 of the locking element 314, shown in FIG. 11, on the upper edge of the lever end 315 that faces the rollover bar 6 and runs in the axial direction of the cap bolt 330 of the locking element 314.

The locking element 314 is designed to be flexible, at least in sections, so that the downward moving rollover bar 6, when sliding along the slope 319, is deflected away with the mating element 318 of the locking element 314 in the direction of the arrow 375, apparent in FIG. 11, until the detent section 316 snaps in and holds the rollover bar 6.

Figure 12:
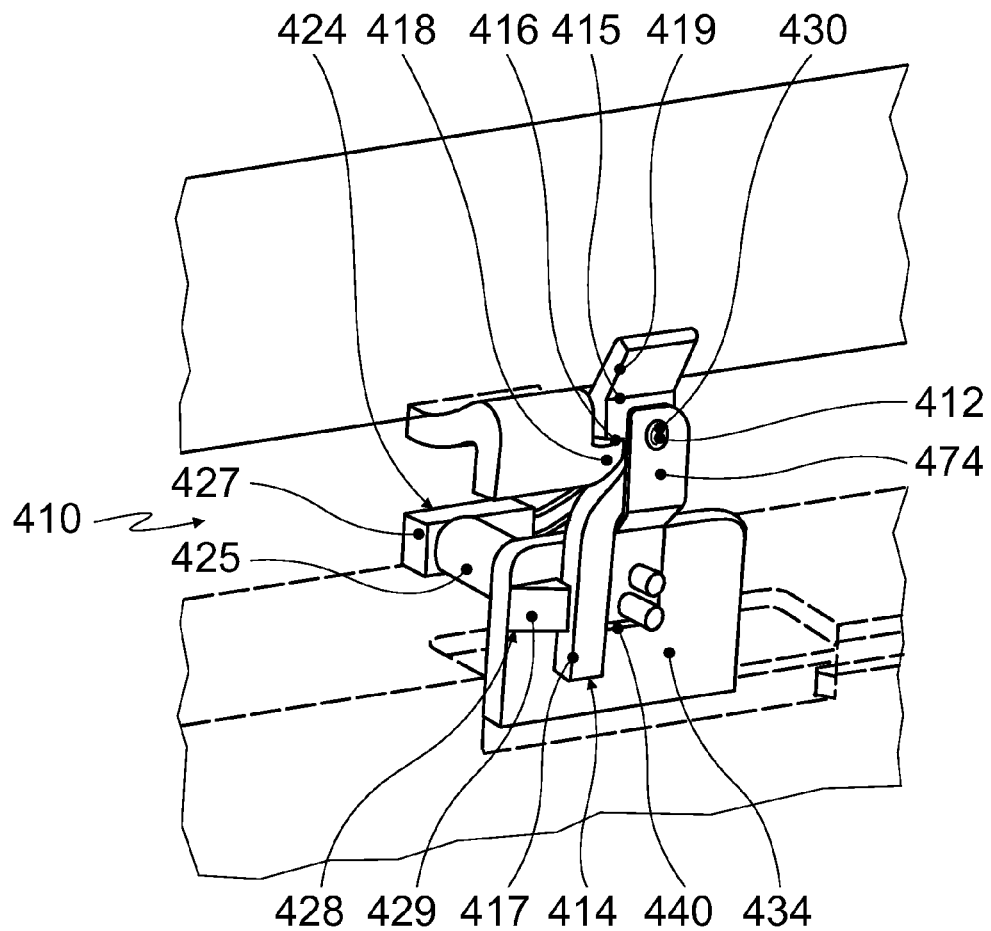
FIG. 12 is a front view of another pyrotechnic embodiment of a releasable holding device for the rollover protection system of the modular unit according to FIG. 1 or FIG. 6 in a rest state of the rollover element.

FIG. 12 shows, in a simplified view, another embodiment of a holding device 410 for holding the rollover bar 6, which corresponds to the embodiment depicted in FIG. 10 and FIG. 11 with respect to the locking element, but can be driven pyrotechnically and can be used as an alterative to the holding device 310 depicted in FIG. 10 to FIG. 11.

Like the holding devices described thus far, the holding device 410 also includes a locking element 414, pivotable around a fixed axis of rotation 412, which is designed essentially like the locking element 314 of the holding device 310 depicted in FIG. 10 and FIG. 11 on its periphery with a detent section 416, and which cooperates with a mating element 418 on the rollover bar 6. The mating element 418, in this embodiment, is also designed as a shoulder of a hook element, which is fastened to the lower edge of the rollover bar 6.

To release the rollover bar 6, the locking element 414 must be transferred from a rest position, depicted in FIG. 12, in which the locking element 414 is engaged with the mating element 418, to a pivoted position in which the locking element 414 releases the rollover element 6.

The locking element 414 is designed in the fashion of a pivot lever, in which one lever end 415 lies against the detent section 416 for engagement with the mating element 418, and the other lever end 417 lies laterally against a stop element 428, which forms an abutment for the force exerted by the rollover element 6 on the locking element 414 and prevents a rotation of the locking element 414.

To support the locking element 414 on the first module 4 of the rollover protection system 11, which is attached to the body, a bearing plate 474, mounted to a support plate 434 that is held on the transverse support 40, is provided. The bearing plate 474 lies against one side of the support plate 434 and is guided by a tab 440 and carries on a cap bolt 430 for the pivotable locking element 414. The bearing plate 474 is bent in a S-shaped configuration opposite the bearing of the bolt 430, so that the locking element 414, the bearing plate 474, and the cap bolt 430 form have a cover in the axial direction of the cap bolt 430, and therefore require only limited design depth.

The actuator 424, operable to pivot of the locking element 414, in this case has a pyrotechnic propellant charge 425. The pyrotechnic propellant charge 425, in the depicted embodiment, is arranged on the side of the support plate 434 that faces away from the stop element 428 and the bearing plate 474, so that its effective direction is essentially perpendicular to the pivot direction of the locking element 414.

The pyrotechnic propellant charge 425 drives a pin that passes through the support plate 434. When electrical current is provided to the pyrotechnic propellant charge 425, by means of an ignition device 427 during an accident signal, the pin is pushed by the pyrotechnic propellant charge 425 in the direction of the lower lever end 417 of the locking element 414, to such an extent that the lower lever end 417 of the locking element 414 is raised above the stop element 428. As a result of the force acting against the rollover element 6 in the deployment direction, the locking element 414 is then pivoted, in which case it slides on a wedge surface 429 of the stop element 428 in the direction of the support plate 434.

The reversal of the holding device 410 to hold the rollover element 6 that has been moved back again into its rest position can occur, in that a back-pivoting of the locking element 414 occurs with a retracted pin of the pyrotechnic propellant charge 425, in which the rollover element 6, during displacement into its rest position, encounters a slope 419 of the locking element 414 running in the axial direction of the cap bolt 430 and formed on the upper edge of the upper lever end 415 of the locking element 414. A certain flexibility of the locking element 414 during sliding of the rollover bar 6 along the slope 419 with the mating element 418 permits a deflection of the locking element 414 in the axial direction of its cap bolt 430, until the detent section 416 engages and holds the rollover bar 6.

FIGS. 13 to 20 show, in a simplified view, another modular unit 3 of a convertible vehicle, in which a rollover protection system 11 is provided having a rollover protection device 22 or 23 allocated to a respective vehicle seats 26, 28, each of which has a first module 4 attached to the body and a second module 5 with a rollover element 24. The rollover element 24 is movable between a lowered rest position and an elevated support position, in which the second module 5 is movable with respect to the first module 4.

In addition, each rollover protection device 22, 23 has a releasable holding device 310 or 410 designed to hold the second module 5 and rollover element 24 in the rest position. A locking device 600 is operable to support the second module 5 in a position that deviates from its rest position automatically against a force acting in the direction of the rest position. Further, a drive system 50 with a spring-force accumulator 52, is operable to bias the second module 5 is in the rest position and, as required, can be displaced in the direction of its support position.

The rollover element 24, in the embodiment depicted here, is designed to be bar-like and, in its interior, has an axial receiving channel 8 for the spring-force accumulator 52. In the embodiments according to FIG. 13, the rollover element 24 is a straight rod element. Although in additional embodiments, a curvature in its upper area may also be provided.

The cross section of the rollover element 24 is essentially round, the inner cross-sectional contour in the embodiment here being oval. On the outside contour, flat spots 7 and connectors 14 are formed enclosing the round core cross section, the flat spots 7 and the connectors 14 serving not only for stiffening, but also for the prevention of rotation of the rollover element 24, and may also constitute being a component of the locking device 600 of the rollover element 24.

Figure 20:
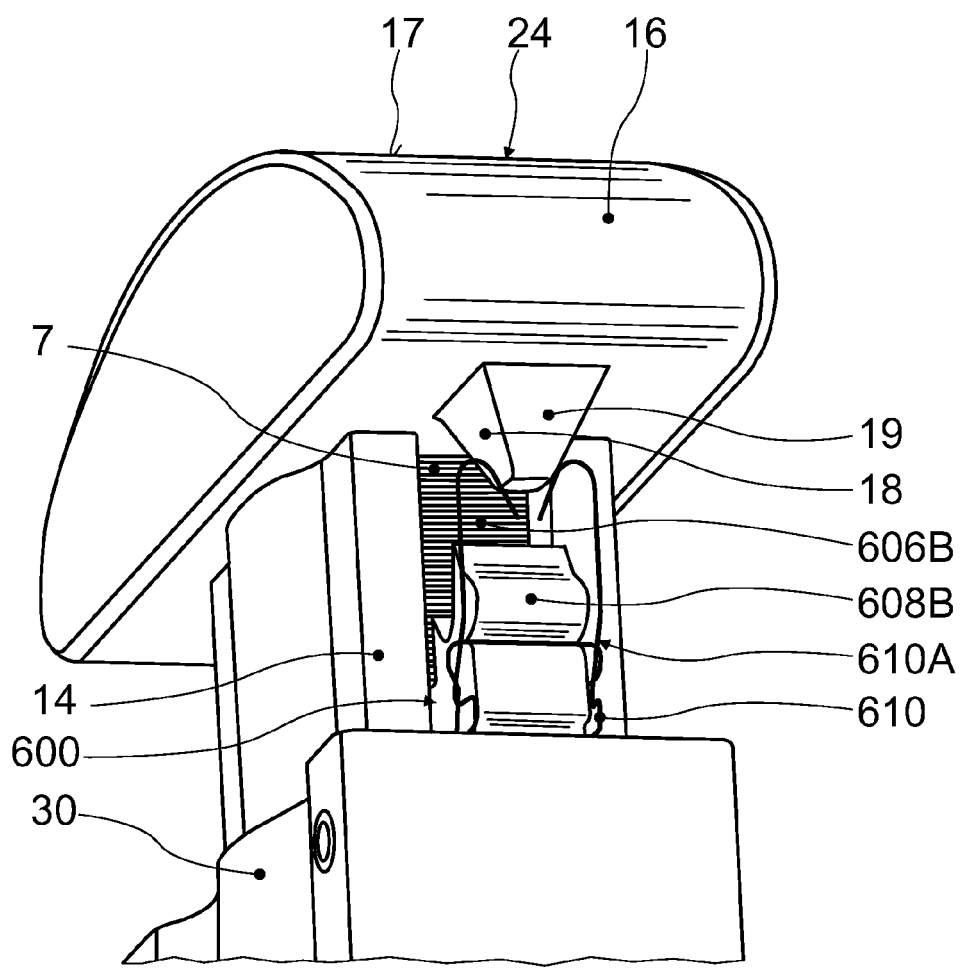
FIG. 20 is a perspective detail of the rollover protection device of the modular unit according to FIG. 13 and FIG. 15.

In the embodiment according to FIG. 13, as in the embodiment according to FIGS. 6 to 9, the guide device 30, which represents a tube profile and serves as a guide device for the rollover element 6, is arranged with its lower edge at a spacing relative to the foot element 34 of the first module 4, in which the guide device 30, in the rest position of the rollover bar 6 or the rollover element 24, which is shown in FIG. 20, encloses an upper end area of the rollover element 6 or 24 and, in the support position of the rollover element 6 or 24, which is shown in FIG. 13 on the left relative to the rollover protection device 23, accommodates the lower end region of the rollover element 6 or 24.

The connection of the guide device 30 with the foot element 34 of the module 4, which is attached to the body, occurs in the depicted embodiment via a connection 38, which is introduced in a correspondingly shaped guide device 30 on the side of the guide device 30 that faces the vehicle side and is mounted thereto.

In the depicted embodiments, the connection 38 is designed as an extruded profile, in which a U-shaped cross-section is chosen in this case for the connection 38. Alternatively, however, any other profile shape of an open or closed profile can be chosen for the connection 38 in the present application, in which the choice of geometry is made with respect to the slimmest possible design for the rollover protection system 11.

In the embodiment according to FIG. 13, the rollover protection devices 22, 23 of two vehicle seats in a row of seats are arranged essentially off-center relative to the corresponding vehicle seat in the opposite direction, so that sufficient space is present for a large pass-through opening 60 between the rollover protection devices 22, 23, such that bulky objects from a rear stowage space or trunk 12 can be transferred into the passenger compartment 11.

The rollover protection devices 22, 23 are also each connected here to an accident sensor mechanism of the vehicle of the customary design (not shown), operate to control the holding device 310 or 410.

In the presence of an accident signal, the corresponding holding device 310, 410 releases the rollover element 24, so that the rollover element 24 is moved by the force of the spring-force accumulator 52 from the rest position to the deployed upper support position, where it is subsequently secured against retraction by the locking device 600.

In order to be able to better absorb the forces of a vehicle rollover, the rollover element 24 has an impact profile 16 provided on its upper end with an enlarged impact surface 17 relative to the cross-sectional surface of the rollover element 24. The impact profile 16, which prevents penetration of the bar-like rollover element into the ground during a vehicle rollover, is present, as shown, in particular, in FIG. 17, as a hollow profile with several cavities, which has a curvature on its surface or impact surface that faces away from the bottom of the vehicle body. The impact profile 16 is closed at its sides with base plates 20.

Figure 16:
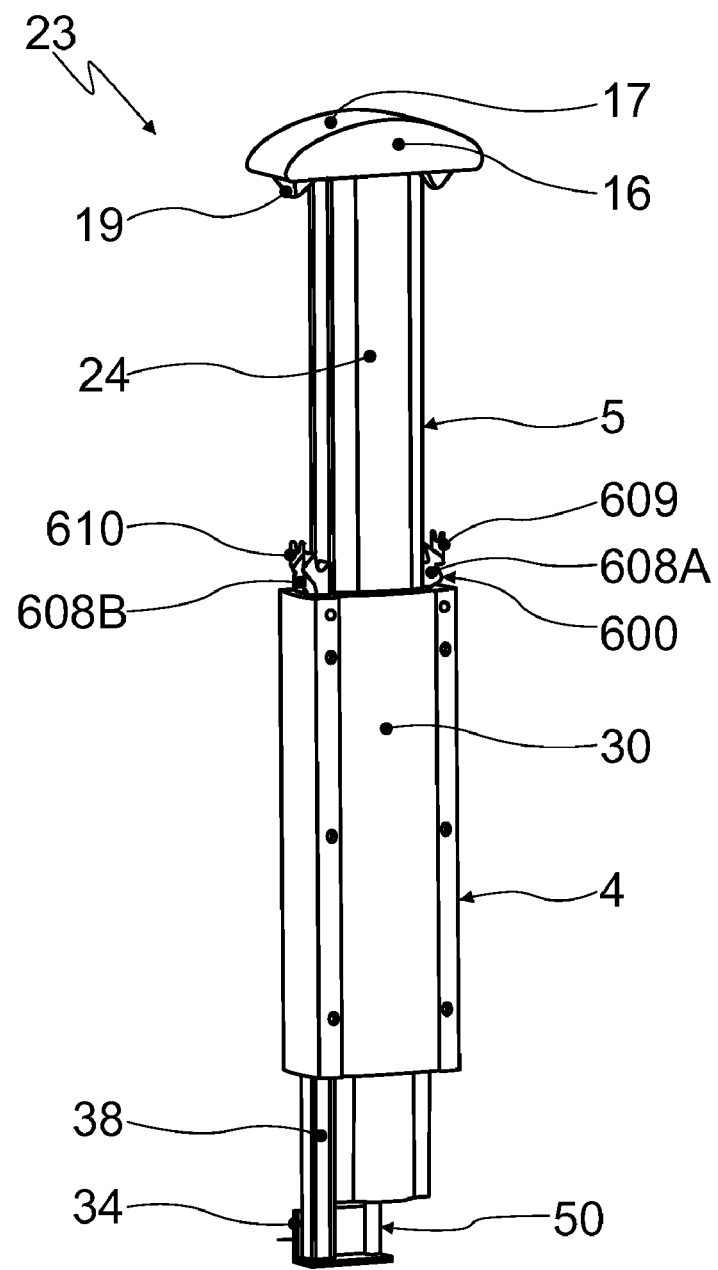
FIG. 16 is a three-dimensional individual view of a rollover protection device of a rollover protection system of the modular unit according to FIGS. 13, 14 and 15.
Figure 17:
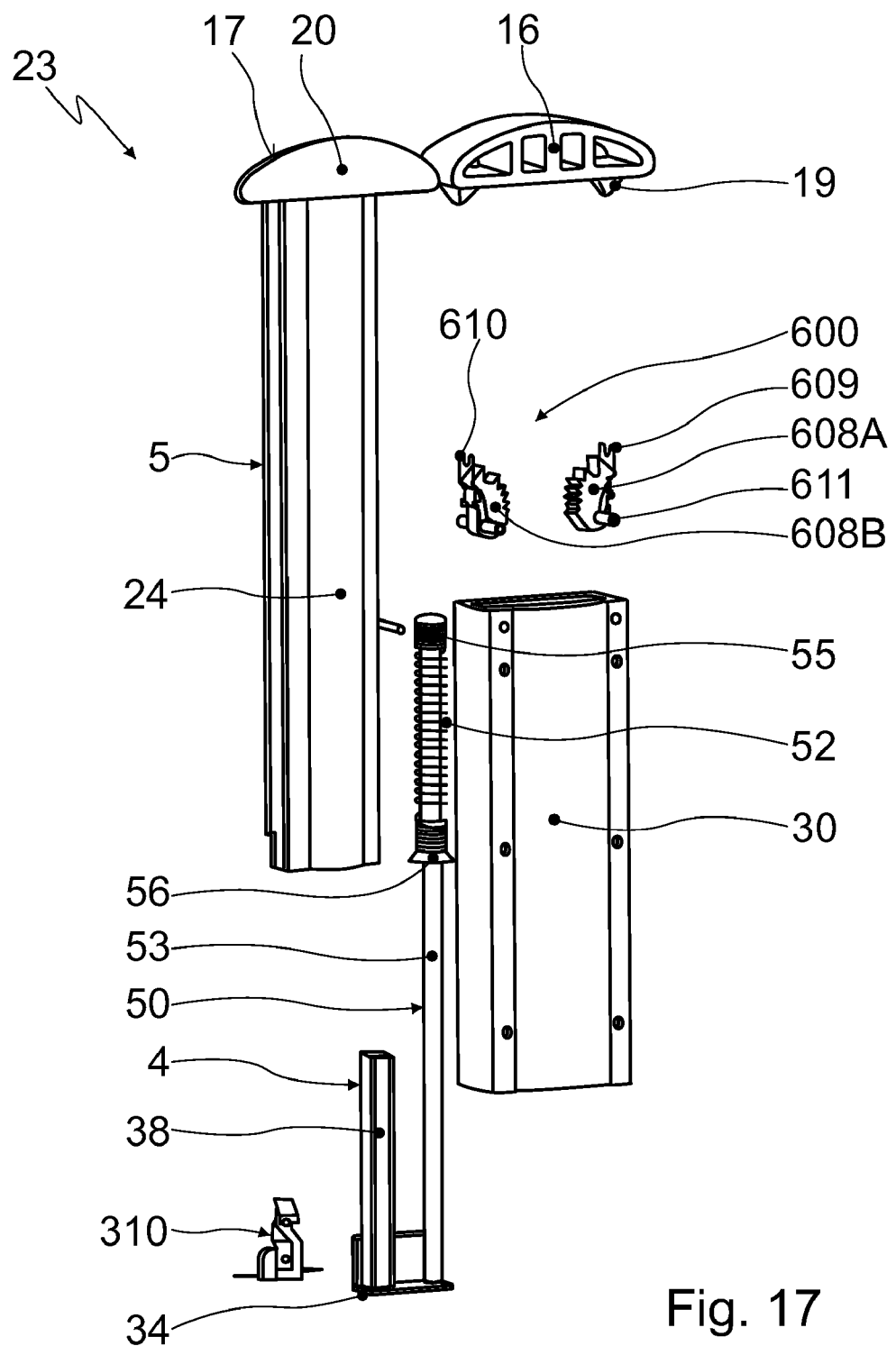
FIG. 17 is an exploded view of the rollover protection device of FIG. 16.

FIGS. 16 and 17 further show the embodiment of the rollover protection device 23, which is part of the modular unit 3 depicted in FIG. 13 with an similar embodiment of the corresponding rollover protection device 22.

As is apparent in FIG. 17, in the embodiment according to FIG. 13, the drive system is modified. The spring force accumulator 52, in contrast to the drive system 50 depicted in FIG. 2 with a compression spring, is formed as a tension spring 52, guided in a receiving channel 8 of the rollover element 24 on a spring guide rod 53. A spring suspension 55 is formed on the spring guide rod 53 at its upper end, and a spring retainer 56 is mounted to move on a center area, in which the tension spring 52 is biased in tension between the spring suspension 55 and the spring retainer 56 lying against the stop of the rollover element 24 in the rest position of the rollover element 24.

The embodiment according to FIG. 13 further differs from the embodiments previously described with respect to the employed locking device 600 for automatic locking of the rollover element 24 when deployed in its support position.

The locking device 600, like the locking device 500, has at least one first catch device 605, which is firmly connected to the first module 4, and can be effectively connected to a second catch device 606 that is firmly connected to the second module 5 to support the second module 5, and which permits a movement of the second module 5, starting from its rest position, in the direction of its support position.

The first catch device 605 of the locking device 600, in the practical example depicted in FIG. 13, includes two blocking elements 608A, 608B mounted on the body to rotate about an axis 621 in the direction of their effective position and each designed with a tooth profile 607.

Figure 18:
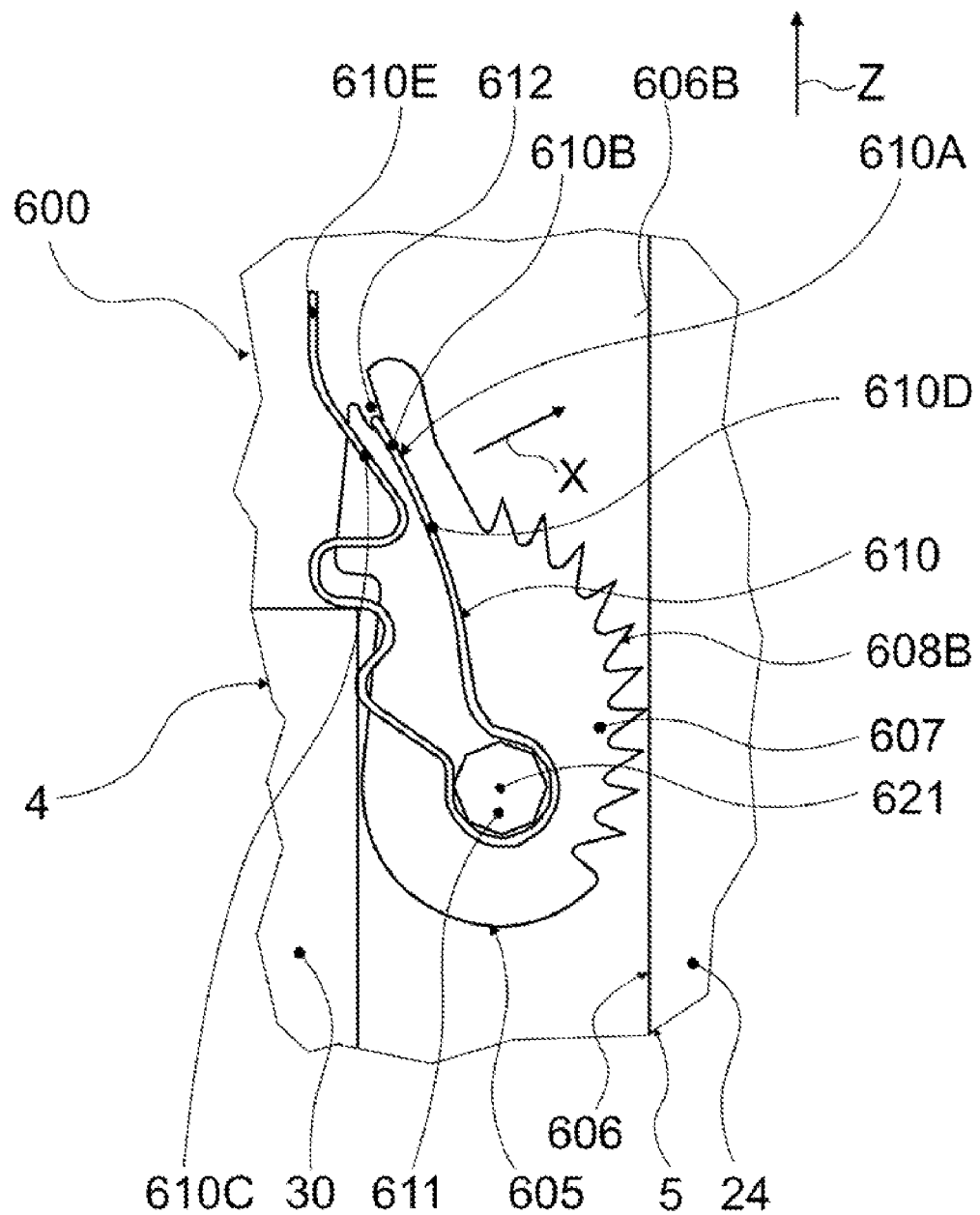
FIG. 18 is a partial sectional view of an area of the locking device of the rollover protection device according to FIG. 16 and FIG. 17.

Spring devices 609, 610, such as a clip wire spring, is allocated to each blocking element 608A, 608B, such that the blocking elements 608A, 608B are spring-loaded in the direction of the effective position of the first catch device 605, so that the blocking elements 608A, 608B are pivoted around cap bolts 611 from the position depicted in FIG. 18 in a direction of rotation depicted by an arrow X in FIG. 18.

Figure 19:
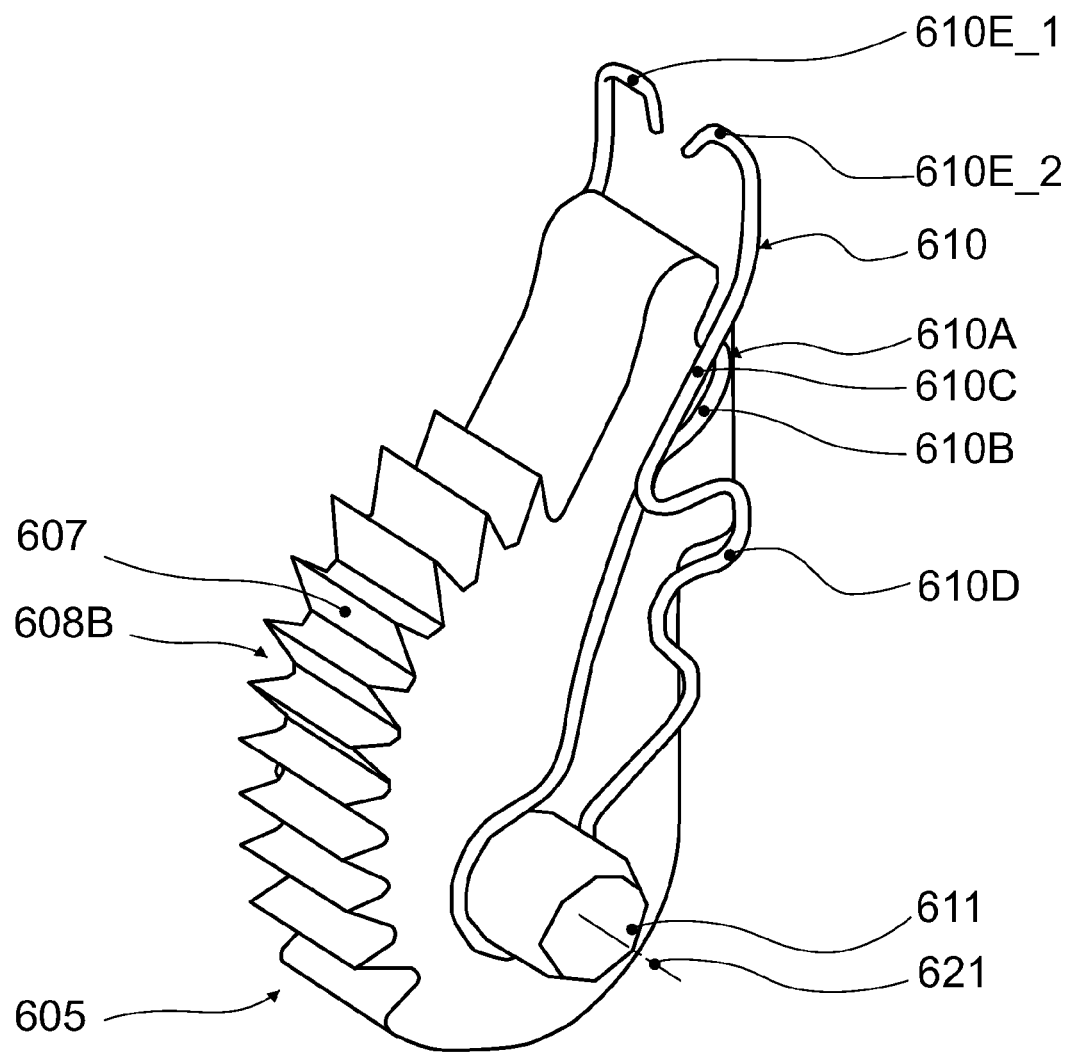
FIG. 19 is a three-dimensional view of a catch device of the locking device according to FIG. 18 in a single position.

The cap bolts 611 are supported here on the module 4, which is attached to the body, in which the blocking elements 608A and 608B are fixed via the spring devices 609 and 610, designed as wire springs, and by the cap bolt 611 as depicted in FIGS. 18 and 19.

For this purpose, the spring devices 609 and 610 engage the cap bolts 611 on both sides of the blocking elements 608A and 608B, and are designed in this case to be disk-shaped. The spring devices 609 and 610 are biased in the installed position by the cap bolts 611, enabling adjustment of the friction force between the spring devices 609 and 610 and the cap bolts 611 to a value at which the blocking elements 608A and 608B are not movable with respect to the cap bolts 611.

This embodiment, as compared with a press-fit between the cap bolts and the blocking elements, leads to a reduction in manufacturing costs, and to a simplification of assembly, since fewer demands are placed on manufacturing tolerances in the area of the joint diameter, and the cap bolts can be joined to the blocking elements with lower manufacturing expense. In addition, the above-described locking of the blocking elements 608A and 608B on the cap bolts 611 via the spring devices 609 and 610, as compared with a securing of the blocking elements on the cap bolts via separate fastening elements, also leads to a reduction of manufacturing costs, and also to a simplification of assembly, since, in the solution depicted in FIG. 18 and FIG. 19, the number of parts is low and locking the blocking elements on the cap bolts is produced in a single assembly step, in which the spring devices 609 and 610 are pushed over the cap bolts 611 and locked.

The second catch device 606 is formed here by a surface 606B of the second module 5 or the rollover element 6 that faces a blocking element 608A or 608B and is movable relative to the corresponding blocking elements 608A and 608B, with which the tooth profile 607 of a blocking element 608A or 608B in the effective position is in frictional engagement with the first catch device 605, so that a movement of the second module 5 from a position deviating from the support position in the direction of its rest position is prevented.

The spring devices 609 and 610 allocated to the blocking elements 608A and 608B are each designed with blocking devices 610A, in which the blocking elements, when the blocking device 610A is activated, can be held in a position that is equivalent to a deactivated state of the first catch device 605. For this purpose, the spring devices 609 and 610 are each designed with a first clip area 610B that can be brought into effective connection with a second clip area 610C in the manner depicted in FIG. 19 for activation of the blocking devices 610A, so that the blocking elements 608A and 608B are held in the positions that are equivalent to the deactivated state of the first catch device 605, in which a relative movement between the first module 4 and the second module 5 is not prevented by the locking device 600.

The spring devices 609 and 610 are each inserted with a first arm 610D, which is designed to be essentially U-shaped, into slit-like recesses 612 of the blocking elements 608A and 608B and lie with their second arm 610E against the module 4, so that the spring devices 609 and 610 are in a biased position. Because of this bias, the blocking elements 608A and 608B, in the deactivated state of the blocking devices 610A, are pivoted around the cap bolts 611 into their positions that are equivalent to the locked state of the first catch device 605.

The first clip areas 610B of the spring devices 609 and 610 each represent areas connected to the middle area, i.e., the U-cross-arm of the spring devices 609 and 610, which is inserted into the slit-like recess 612 of the blocking element, in which areas the first arm 610D of the clip wire springs is made with a greater width than the second clip areas 610C on congruent areas of the second arm 610E formed with two open clips.

The arms 610D and 610E of the spring devices 609 and 610 therefore form the blocking devices 610A, so that they intersect in the activated state of the blocking devices 610A in the region of the clip areas 610B and 610C, clamping behind each other, mutually hold each other and cannot separate, because of the bias, as illustrated in FIG. 19.

For the release or deactivation of the blocking devices 610A, the wire springs 609 and 610, in the region of their free ends, are designed with clip ends 610E_1 and 610E_2 that are movable relative to each other in the manner shown in FIG. 19. This means that the blocking devices 610A can be deactivated or activated, in that the spacing of the clip wire ends of the spring devices 609 and 610 is increased, so that the arms of the spring devices 609 and 610 can be moved past one another in the region of the clip areas 610B and 610C.

The blocking elements 608A and 608B are then either held in the non-blocking position by the blocking device 610A or released to set the active position of the first catch device 605.

When the blocking device 610A of the spring device 610, which is allocated to the blocking element 608B of FIG. 17, is deactivated, the blocking element 608B is pivoted around the cap bolts 611 by the spring device 610 into a position corresponding to the active state of the first catch device 605. In this position of the blocking element 608B, a deployment movement of the second module 5 in the direction of the support position is permitted by the first catch device 605, but a movement of the second module 5 into its rest position is effectively prevented by an effective engagement between the tooth profile 607 of the blocking element 608B and the second catch device 606.

The bias force of the spring devices 609 and 610 in the direction of the active positions of the blocking elements 608A and 608B is prescribed here, so that contact of the blocking elements 608A and 608B on the catch device 606, formed here as a surface of the rollover element 24, does not prevent a deployment movement. The blocking elements 608A and 608B, representing toothed cams, are pivoted around the cap bolt 611 against the direction of rotation X during the deployment movement of the rollover element 6 and therefore exert no blocking effect between the two catch devices 605 and 606.

When the blocking element 608B is pivoted into its active position, the blocking element 608B, with its tooth profile 607 facing the locking surface 606B, engages, at least in areas, into the locking surface 606B of the catch device 606, so that shape-mating is present between the blocking element 608B and the rollover element 24 and the rollover element 24 is securely held against a retraction movement in the direction of the rest position.

In the embodiment depicted in FIG. 13, the tooth geometry of the tooth profile 607 is designed with teeth having blade-like ends tapering to a point, and the material for the tooth profile 607 is harder than the material of the surface of the rollover element 24, in order to guarantee reliable locking of the rollover element 24.

Whereas essentially only a deformation of the surface contacted by the blocking element is prescribed here, as an alternative to this, elastic deformability of the tooth profile can also optionally be prescribed.

A plurality of unlocking elements 19 are provided below the impact profile 16 or the rollover elements 24. The unlocking elements 10 are designed as truncated pyramids and having wedge-shaped surfaces 18, by means of which the blocking elements 608A, 608B, after a retraction movement of the rollover element 24 in the direction of its rest position, are engaged with the second catch device 606.

For reversal into the initial or rest position of the rollover element 24, the blocking elements 608A, 608B are retracted, in which the widened clip areas 610B of the spring devices 609 and 610 hook behind the free clip areas 610C and therefore nullify the effect of the wire springs 609, 610. The rollover element 24 can therefore be lowered into the rest position. Upon reaching the rest position of the rollover element 24, the free spring ends 610E_1, 610E_2 are forced apart via the aforementioned unlocking elements 19 of the rollover element 24, so that the spring devices 609 and 610 bring the toothed cams or blocking elements 608A, 608B into engagement with the locking surface 606B of the rollover element 24.

To increase the locking force of the locking device 600, the locking surfaces 606B are formed herewith a knurling or with profiling that increases the friction coefficient of the locking surfaces 606B.

In the described practical example, the blocking elements 608A and 608B are mounted on the first module 4, which is attached to the body, however, a reversed arrangement with support on the deployable module and frictional engagement on a surface attached to the body can also be provided.

Figure 15:
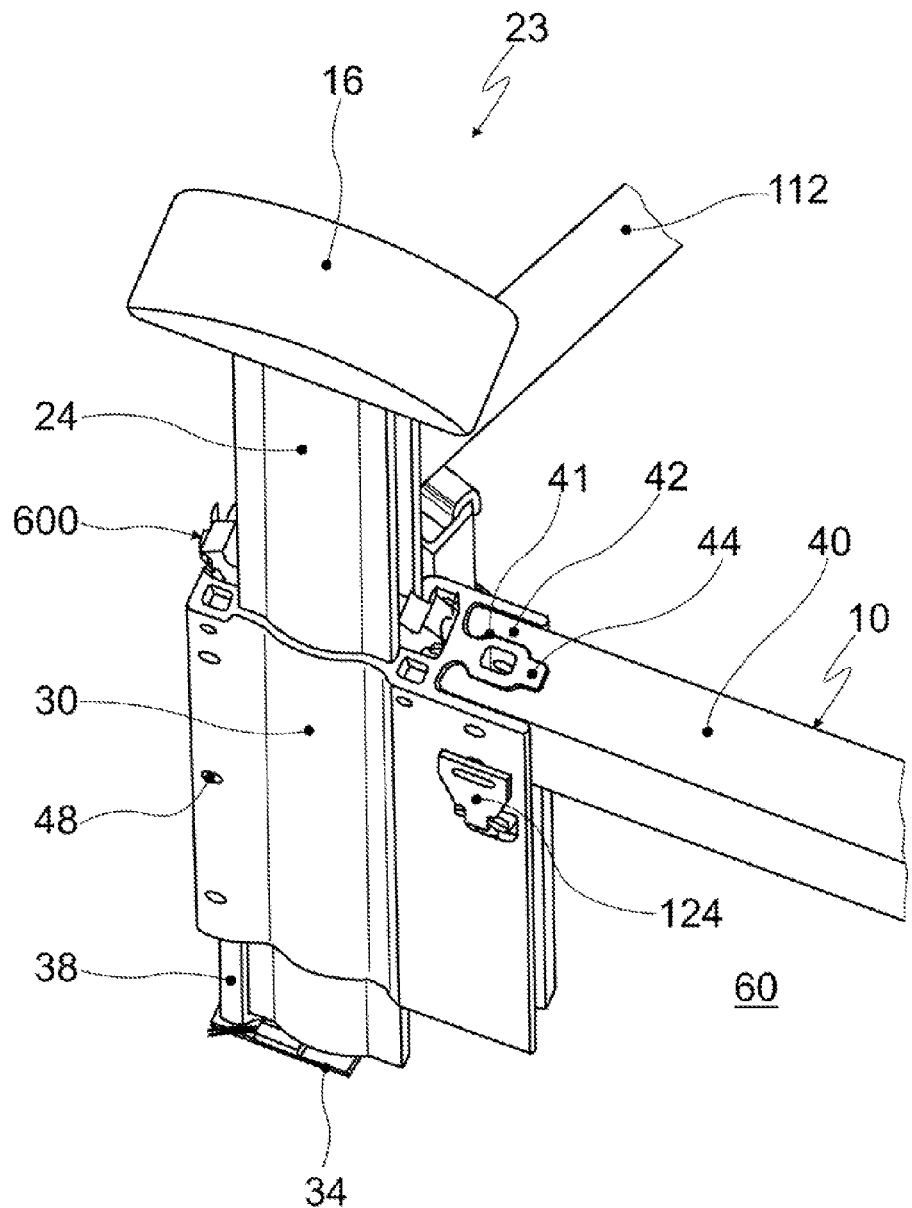
FIG. 15 is a perspective top view of an area of the modular unit of FIG. 13 and FIG. 14.

The transverse stiffening structure 10 with the pass-through 60 is also essentially formed by the transverse support 40 in the embodiment depicted in FIG. 13. As shown in FIG. 15, the ends of the transverse support 40 in this embodiment are formed with a profile 42 having undercuts 41, which corresponds, in terms of its shape, to a profile 44 of the tubular shape of the guide devices 30 of the first module 4. The profiles 42 and 44 are respectively configured to be W-shaped or U-shaped, so that the transverse support 40 can be inserted with its U-shaped profile 42 into the W-shaped profile 44 of the tubular guide device 30, so that the transverse support 40 is clamped in shape-mated fashion into the tubular shaped guide device 30 and can optionally be additionally secured by screw connections.

The transverse support 40 therefore forms a pre-installable unit with the rollover protection devices 22, 23, which can be screwed to the vehicle structure by lateral holes 48.

In the practical embodiment depicted in FIG. 13, the first module 4 of the corresponding rollover protection device 22, 23, is also formed with an integrated restraint belt system 100, in which, at mid-height of the guide device 30, a belt winder 110 is inserted in a profile area 35 of the tubular guide device 30, which is attached to the vehicle, mounted in front of the rollover element 24 in the front direction of the vehicle. The safety belt 112 is guided by this belt winder 110 in the profile area 35, designed as a hollow profile, to an upper safety belt guide or deflection 114 and from there into the occupant space 11.

As in the embodiment according to FIGS. 6 to 9, the restraining belt system 100 includes two upper anchoring points 120, 122 for a child safety seat belt, in which a rollover protection device 22 or 23 forms one of the upper anchoring points 120 or 122.

The modular unit 3 according to FIG. 13 also has seat elements, in which the rollover protection devices 22, 23 each have a seat connection device in the form of lower seatback supports 152, 154 and upper seatback locking pins 156, 158 for a first vehicle seat 26 and a second vehicle seat 28 of a row of seats, which, in the present case, are rear seats.

As in the first modular unit 1 and the second modular unit 2, the third modular unit 3 according to FIG. 13 can be connected with a convertible top to an externally preinstalled multifunctional module.

The assignment of the individual described components to the depicted practical examples is only an example, so that any combination of the described components and their joining into a multifunctional module is possible.

While the best modes for carrying out the invention have been described in detail, those familiar with the art to which this invention relates will recognize various alternative designs and embodiments for practicing the invention within the scope of the appended claims.

The invention claimed is:

1. A modular unit for a convertible vehicle comprising:
a transverse stiffening structure operable to separate an occupant space and a rear stowage space when the modular unit is installed into the convertible vehicle;
a rollover protection system including:
a first module mounted with respect to the vehicle and having guide devices;
a second module engaged with the guide devices and movable between a lowered rest position and an elevated support position, the second module including at least one rollover element;
a selectively releasable holding device operable to hold the second module in the direction of the rest position;
a locking device operable to support the second module in a position that deviates from the rest position against a force acting in the direction of the rest position;
a drive system operable to hold the second module pre-stressed in the rest position and selectively move the second module from the rest position to the support position;
a plurality of seat elements, wherein the seat elements are at least one of seatback supports, seatback locking pins, headrest supports, seatbacks and seat lower parts;
a restraining belt system at least partially integrated into the first module, wherein the restraining belt system provides a plurality of belt guides for at least one restraining belt; and
wherein the modular unit is pre-assembled outside of the vehicle and sufficiently configured to be tested for functional capability outside of the vehicle.

2. The modular unit of claim 1, wherein the modular unit includes at least one portion of a convertible top.

3. The modular unit of claim 2, wherein the convertible top includes a rear body cover.

4. The modular unit of claim 1, wherein the seat elements are seatback supports.

5. The modular unit of claim 1, wherein the seat elements are designed as head support mounts mounted to the transverse stiffening structure.

6. The modular unit of claim 1, wherein a pass-through opening is at least partially defined by the vehicle and is provided between the rear stowage space and the occupant space.

7. The modular unit of claim 1, wherein the restraining belt system includes at least one upper anchoring point for a child safety seat restraining belt.

8. The modular unit of claim 1, further comprising:
a vehicle seat;
a rollover protection device mounted adjacent to the vehicle seat;
wherein the rollover element is bar-like in form;
a spring force accumulator forming a portion of the drive system; and
wherein the rollover element is sufficiently configured to receive at least a portion of the spring force accumulator.

9. The modular unit of claim 1, further comprising:
a first and second vehicle seat spaced from each other;
a first and second rollover protection device disposed with respect to the respective first and second vehicle seats
wherein the first and second rollover protection devices are arranged in opposite directions, off-center relative to the respective first and second vehicle seats.

10. The modular unit of claim 9, wherein the first and second rollover protection devices are joined by a transverse support.

11. The modular unit of claim 1, wherein the rollover element is a rollover bar, which spans substantially the vehicle width and has a generally U-shaped configuration and wherein the rollover element includes a cross-arm and lateral arm elements.

12. The modular unit of claim 11, wherein the cross-arm and the arm elements of the rollover bar are formed in one piece.

13. The modular unit of claim 11, further comprising:
a synchronization device operable to synchronize the movement of the arms of the rollover bar along the guide devices; and
wherein the holding device operates to selectively release the rollover bar from a central location between the arms.

14. The modular unit of claim 13, wherein the synchronization device includes a synchronization shaft fixedly mounted in parallel relation to the cross-arm, and wherein the synchronization shaft is connected to the arm elements via a tooth profile, which engages in a catch strip formed on the corresponding arm element.

15. The modular unit of claim 1, wherein the guide device of the first module has a tube profile.

16. The modular unit of claim 15, wherein the tube profile of the guide device for the rollover element is arranged such that a lower edge of the guide device is positioned relative to a foot element of the first module, and wherein the guide device is mounted to the foot element.

17. The modular unit of claim 1, wherein the releasable holding device includes a locking element, pivotable about a fixed axis of rotation, and having a detent section for engagement with a mating element disposed with respect to the rollover element when the rollover element is in rest position, wherein the locking element in the rest position is held in a stop position, from which it can be transferred to a rotation position in the event of an accident by an actuator with a pyrotechnic propellant charge.

18. The modular unit of claim 1, wherein the locking device has at least one first catch device, which can be effectively connected to a second catch device to support the second module and permits movement of the second module, starting from its rest position, in the direction of its support position, in which one of the catch devices is connected to one of the modules and has a blocking element mounted to rotate eccentrically around an axis of rotation and having a tooth profile, and the other catch device is designed as a surface of the other module facing the blocking element, with which the tooth profile of the blocking element is in frictional engagement in its active position, so that movement of the second module from a position deviating from its rest position in the direction of its rest position is prevented.

19. The modular unit of claim 18, wherein the blocking element is operable to selectively deform the surface.

20. The modular unit of claim 18 wherein a spring device engages the blocking elements to bias the blocking elements in a direction of its active position to form a blocking device, such that when the blocking device is activated, the blocking device can be held in a position that is equivalent to a deactivated state of the first catch device, wherein the spring device has a wire spring and the blocking device is designed with at least a first clip area operably connected with a second clip area of the spring device for activation of the blocking device.

21. The modular unit of claim 20, wherein the wire spring is arranged with a first arm disposed in a recess of the blocking element and engages the first module with a second arm, such that the wire spring is in a biased position that pivots the detent, when the blocking device is deactivated into a position that is equivalent to the activated state of the first catch device.

22. A modular unit for a convertible vehicle comprising:
a transverse stiffening structure operable to separate an occupant space and a rear stowage space;
a rollover protection system including:
a first module mounted with respect to the vehicle and having guide devices;
a second module engaged with the guide devices and movable between a lowered rest position and an elevated support position, the second module including at least one rollover element;
a selectively releasable holding device operable to hold the second module in the rest position, wherein the selectively releasable holding device includes a locking element pivotable about a fixed axis of rotation, wherein the locking element includes a detent section for engagement with a mating element disposed with respect to the rollover element when the at least one rollover element is in the rest position, and wherein the locking element is held by a fusible insert of an actuator that can be melted in the event of a vehicle accident;
a locking device operable to support the second module in a position that deviates from the rest position against a force acting in the direction of the rest position;
a drive system operable to selectively bias the second module from the rest position and to the support position;
a plurality of seat elements
a restraining belt system
wherein the plurality of seat elements and the restraining belt system are at least partially integrated into the first module;
a plurality of belt guides for at least one restraining belt; and
wherein the modular unit is sufficiently configured to be tested for functional capability outside of the vehicle.

23. The modular unit of claim 22, wherein the locking element, in the rest position, is forced radially against a seat that can be eliminated by melting of the fusible insert.

24. The modular unit of claim 22, wherein the locking element, in the rest position, is loaded radially under tension and connected via the fusible insert to a base element.

25. The modular unit of claim 24, wherein the locking element is a lever, in which a first lever end forms the detent section for engagement with the mating element and substantially adjacent a second lever end, a mount for the fusible insert connected to an energy supply device is disposed.

26. The modular unit of claim 25, wherein the locking element, in the region of the first lever end, that faces the rollover element includes a slope that runs in the axial direction and is generally flexible, such that the locking element, during a reversal of the release of the rollover element, can be deflected by the mating element of the downward moving rollover element to an engagement of the detent section.

27. A modular unit for a convertible vehicle comprising:
a transverse stiffening structure operable to separate an occupant space and a rear stowage space;
a rollover protection system including;
a first module mounted with respect to the vehicle and having guide devices;

a second module engaged with the guide devices and movable between a lowered rest position and an elevated support position, the second module including at least one rollover element, wherein the rollover element is a rollover bar, which spans substantially the vehicle width and has a generally U-shaped configuration and wherein the rollover element includes a cross-arm and lateral arm element;

a selectively releasable holding device operable to hold the second module in the rest position;

a synchronization device operable to synchronize the movement of the arms of the rollover bar along the guide devices, wherein the selectively releasable holding device operates to selectively release the rollover bar from a central location between the arms, wherein the synchronization includes a synchronization shaft fixedly mounted in parallel relation to the cross-arm, and wherein the synchronization shaft is connected to the arm elements via a tooth profile, which engages in a catch strip formed on the corresponding arm element;

a locking device operable to support the second module in a position that deviates from the rest position against a force acting in the direction of the rest position, wherein the locking device has a first catch device, which can be brought into engagement with a second catch device for support of the second module and permits movement of the second module from the rest position in the direction of the support position, wherein a catch element of the first catch device is designed to have a tooth profile engageable with both the synchronization shaft and the catch strip of the arm elements in the locked operating state of the locking device;

a drive system operable to selectively bias the second module from the rest position and to the support position;

a plurality of seat elements;

a restraining belt system;

wherein the plurality of seat elements and the restraining belt system are at least partially integrated into the first module;

a plurality of belt guides for at least one restraining belt; and wherein the modular unit is sufficiently configured to be tested for functional capability outside the vehicle.

28. The modular unit of claim 27, wherein the tooth profile of the catch element of the first catch device, in the unlocked operating state of the locking device, is engaged with at least one of the synchronization shaft and the catch strip.

29. The modular unit of claim 27, wherein the tooth profile of the catch element of the first catch device in the unlocked operating state of the locking device is not engaged to either the synchronization shaft or to one of the catch strips.

30. The modular unit of claim 27, wherein the tooth of the catch elements of the first catch device is spring biased in the direction of its effective position that is equivalent to the locked operating state of the locking device.

31. The modular unit of claim 27, wherein the tooth profile of the catch element of the first catch device is engaged with a guide element disposed within a generally arc-like control cam, such that it is guided in a controlled fashion in engagement with the synchronization shaft and the catch strip during a retraction movement of the second module.

32. The modular unit of claim 31, wherein the guide element is generally ellipsoid in cross-section, such that a rotation of the tooth profile element, relative to the synchronization shaft and/or the catch strip, is prevented.

* * * * *